United States Patent
Parantainen et al.

(10) Patent No.: US 7,054,268 B1
(45) Date of Patent: *May 30, 2006

(54) METHOD AND ARRANGEMENT FOR TRANSFERRING INFORMATION IN A PACKET RADIO SERVICE WITH APPLICATION-BASED CHOICE OF RELEASE MODE

(75) Inventors: Janne Parantainen, Helsinki (FI); Mika Forssell, Espoo (FI)

(73) Assignee: Nokia Mobile Phones, Inc., Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 09/499,009

(22) Filed: Feb. 4, 2000

(51) Int. Cl.
*H04J 1/16* (2006.01)
*H04J 3/14* (2006.01)

(52) U.S. Cl. .................. 370/231; 370/235; 370/466

(58) Field of Classification Search ............ 370/229, 370/231, 235, 341, 347, 466, 476, 442, 443, 370/410, 468, 338; 455/452.1, 452.2
See application file for complete search history.

(56) References Cited

U.S. PATENT DOCUMENTS

| | | | | |
|---|---|---|---|---|
| 6,044,266 A * | 3/2000 | Kato | ............ | 455/422.1 |
| 6,477,181 B1 * | 11/2002 | Fujimori et al. | ........... | 370/476 |
| 6,490,271 B1 * | 12/2002 | Erjanne | ............ | 370/347 |
| 6,529,497 B1 * | 3/2003 | Hjelm et al. | ........... | 370/347 |
| 6,532,225 B1 * | 3/2003 | Chang et al. | ........... | 370/341 |
| 6,683,860 B1 * | 1/2004 | Forssell et al. | ........... | 370/329 |
| 2004/0120253 A1 * | 6/2004 | Forssell et al. | ........... | 370/230 |

FOREIGN PATENT DOCUMENTS

| | | |
|---|---|---|
| EP | 1021017 | 7/2000 |
| WO | 9948310 | 9/1999 |

OTHER PUBLICATIONS

Digital Cellular Telecommunications Systems (Phase 2+); General Packet Radio Service (GPRS) Mobile Station etc. GSM 04.60 Version 6.1.0) European Telecommunications Standards Inst.

GSM 04.60 "Digital Cellular Telecommunications System (Phase 2+); General Packet Radio Service (GPRS); Radio Link Control/Medium Access Control (RLC/MAC protocol", Jul. 1998.

International Search Report dated Jun. 25, 2001 (3pp) and notification of its transmittal (3pp).

(Continued)

*Primary Examiner*—Ajit Patel
*Assistant Examiner*—Chirag Shah

(57) ABSTRACT

A method as described by which an application executing in an application layer of a multi-layer communication protocol forming part of a general packet radio service (GPRS) session can signal for the setup and release of Temporary Block Flow (TBF) which will not be released during application execution in silent (inactive) periods. When applications such as voice, telnet or web browsing have specific traffic type data that have inactive periods between active periods are to be carried over GPRS, the session consists of multiple active periods. Current TBF release procedures lead to multiple TBF setups during such sessions. With the method described, a special type of TBF can be set up with special procedures for release of this TBF which greatly minimizes the need for multiple TBF setups during a session containing data transfers with inactive periods between active data transmissions.

48 Claims, 14 Drawing Sheets

OTHER PUBLICATIONS

EN 301 349 v6.1.0 (Aug. 1998); Digital Cellular Telecommunications System (Phase 2+); General Packet Radio Service (GPRS); Mobile Station (MS)—Base Station System (BSS Interface; Radio Link Control/Medium Access Control (RLC/MAC) Protocol (GSM 04.60 v6.1.0 Release 1997).

* cited by examiner

·········· Signalling Interface
────── Signalling and Data Transfer Interface

METHOD AND ARRANGEMENT FOR TRANSFERRING INFORMATION IN A PACKET RADIO SERVICE WITH APPLICATION-BASED CHOICE OF RELEASE MODE

TECHNICAL FIELD

The present invention relates generally to a method and arrangement for transferring information in a packet radio service. It is particularly directed to transferring data, such as voice, telnet, or web browsing in certain instances where there is a traffic type that have inactive periods between active transmissions. The invention is particularly directed to application based choice of Temporary Block Flow (TBF) setup and release.

BACKGROUND OF THE ART

The phrase "mobile telecommunications system" generally refers to any telecommunication system which enables a wireless communication connection between a mobile station (MS) and the fixed parts of the system when the user of the mobile station is moving within the service area of the system. A typical mobile communication system is a Public Land Mobile Network (PLMN). The majority of mobile telecommunication systems in use to date belong to second generation systems such as the well-known Global System for Mobile Telecommunications (GSM) system commonly used in Europe and elsewhere, including the United States. The present invention applies particularly to general packet radio service (GPRS) which forms part of the architecture of Universal Mobile Telecommunications System (UMTS), a third generation system which merges mobile telephony with data communications, especially those for use with the global communications network commonly called the Internet. Data communications can also include multi-media services associated with the Internet. Such services, including Internet real-time services, have gained popularity over the last several years. Internet protocol (IP) telephony and different streaming applications such as audio streaming and video streaming are already quite common on the Internet. In addition, the demand for wireless access to these real-time services is expected to grow at an exponential rate over the near term. Packet switched wireless networks such as GPRS are designed to provide data services such as Internet services, in a cost effective manner. In GPRS, the channels are not dedicated to one user on a continuous basis but are shared between multiple users. This procedure facilitates efficient data multiplexing. However, GPRS was not originally designed for transferring delay sensitive real-time data, such as IP telephony sessions. In general, it was not specifically designed for applications that transfer data that have relatively short inactive periods (no data to be transmitted) between active data transfer periods. For this reason, GPRS currently contains various technical solutions that only partially meet the requirements with regard to real-time traffic. As defined herein, the phrase "specific traffic class" corresponds to data transfer for which the network resources are not to be released during possible inactive periods between active periods. An example of such is a conversational voice connection or an interactive connection e.g. telnet. It is very beneficial in UMTS, but it can also be used in interactive data transfer applications, e.g. telnet.

In order to better understand the problems of prior art solutions as well as the idea of the present invention, the structure of a third generation digital cellular radio system is first described and GPRS is then described in more detail.

FIG. 1a shows a version of a future cellular radio system which is not entirely new with respect to the known GSM system, but which nevertheless includes known elements and new elements. The terminals are connected to the radio access network (RAN) which includes the base stations and the base station controllers. The core network of a cellular radio system comprises mobile services switching centers (MSCs), other network elements (in GSM, e.g. SGSN and GGSN, that is, Serving GPRS Support Node and Gateway GPRS Support Node) and related transmission systems. According to GSM+ specifications developed from GSM, the core network can also provide new services.

A new technology, Enhanced Data Rates for GSM Evolution (EDGE) will increase the network capacity and data access rates of both circuit switching and packet switching so as to meet expected demands of wireless multimedia applications and more market deployment. The transmission speed of circuit switching is increasing with the introduction of High Speed Circuit Switched Data (HSCSD) while packet data rates are being provided by General Packet Radio Services (GPRS). EDGE, a new radio interface technology with enhanced modulation, increases the HSCSD and GPRS data rates by up to three fold. EDGE modulation increases the data throughput provided by the packet switched service even over 400 kbit/s per carrier. Similarly, the data rates of circuit switched data can be increased, or existing data rates can be achieved using fewer timeslots, saving capacity. Accordingly, these higher speed data services are referred to as EGPRS (Enhanced GPRS) and ECSD (Enhanced Circuit Switched Data).

This combination of EGPRS and HSCSD in a network is known as GERAN, GSM EDGE Radio Access Network. FIG. 1c illustrates GERAN, including the EGPRS and ECSD branches of the network. Officially GERAN is a term used to describe a GSM and EDGE based 200 kHz radio access network. The GERAN is based on GSM/EDGE release 99 and covers all new features for GSM Release 2000 and subsequent releases, with full backward compatibility to previous releases.

In GERAN, packet voice service using e.g. AMR (Adaptive Multirate Codec) may be implemented. Such services represent a type of real-time application that typically has periods of silence (no speech). Procedures for handling such applications are required.

FIG. 1b shows an architecture of a general packet radio service (GPRS). As explained, earlier GPRS is a new service that is currently based on the GSM system but the general principles discussed herein can be applied to GRAN (General Radio Access Network). GPRS is one of the objects of the standardization work of the GSM phase 2+ and UMTS at the ETSI (European Telecommunications Standard Institute) and 3GPP. The GPRS operational environment comprises one or more subnetwork service areas, which are interconnected by a GPRS backbone network. A subnetwork comprises a number of packet data service nodes (SN), which in this application will be referred to as serving GPRS support nodes (SGSN) 153, each of which is connected to the mobile telecommunications system (typically to a base station through an interworking unit) in such a way that it can provide a packet service for mobile data terminals 151 via several base stations 152, i.e. cells. The intermediate mobile communication network provides packet-switched data transmission between a support node and mobile data terminals 151. Different subnetworks are in turn connected to an external data network, e.g. to a Public Data Network (PDN) 155, via GPRS gateway support nodes GGSN 154. The GPRS service allows the provision of packet data transmission between mobile data terminals and external data networks when the appropriate parts of a mobile telecommunications system function as an access network.

In order to access the GPRS services, a mobile station first makes its presence known to the network by performing a GPRS attachment. This operation establishes a logical link between the mobile station and the SGSN, and makes the mobile station available for SMS (Short Message Services) 158, 159, over GPRS, paging via SGSN, and notification of incoming GPRS data. More particularly, when the mobile station attaches to the GPRS network, i.e. in a GPRS attachment procedure, the SGSN creates a mobility management context (MM context). Also, the authentication of the user is carried out by the SGSN in the GPRS attachment procedure. In order to send and receive GPRS data, the MS activates the packet data address that it desires to use by requesting a PDP activation procedure (Packet Data Protocol). This operation makes the mobile station known in the corresponding GGSN, and interworking with external data networks can commence. More particularly, a PDP context is created in the mobile station and the GGSN and the SGSN. The packet data protocol context defines different data transmission parameters, such as the PDP type (e.g. X.25 or IP), the PDP address (e.g. X.121 address), the Quality of Service (QoS) and the NSAPI (Network Service Access Point Identifier). The MS activates the PDP context with a specific message, Activate PDP Context Request, in which it gives information on the TLLI, the PDP type, the PDP address, the required QoS and the NSAPI, and optionally the access point name (APN).

FIG. 1*b* also shows the following GSM functional blocks; Mobile Switching Center (MSC)/Visitor Location Register (VLR) 160, Home Location Register (HLR) 157 and Equipment Identity Register (EIR) 161. The GPRS system is usually also connected to other Public Land Mobile Networks (PLMN) 156.

Functions applying digital data transmission protocols are usually described as a stack according to the OSI (Open Systems Interface) model, where the tasks of the various layers of the stack, as well as data transmission between the layers, are exactly defined. In the GSM system phase 2+, which is observed herein as an example of a digital wireless data transmission system, there are five operational layers defined.

The mobile station MS must include a higher-level control protocol 212 and a protocol 213 for serving higher-level applications, of which the former communicates with the RRC layer 206 in order to realize control functions connected to data transmission connections, and the latter communicates directly with the LLC layer 204 in order to transmit such data that directly serves the user (for instance digitally encoded speech). In a mobile station of the GSM system, the blocks 212 and 213 are included in the above-mentioned MM layer.

In GPRS, a Temporary Block Flow (TBF) is created for transferring data packets on a packet data channel. The TBF is a physical connection used by the two Radio Resource (RR) peer entities to support the unidirectional transfer of Logical Link Control (LLC) Packet Data Units (PDU) on packet data physical channels. The TBF is normally always released when there is no data to be transmitted. Such a release creates a problem in voice services and other real-time services such as streaming audio or video when silent periods can occur from time to time. It is also a problem in general where the application has relatively short inactive periods between active transmission periods. Such applications can include telnet and web browsing. During these silent or "passive" periods no data is transferred and the TBF is thus normally released. The TBF setup procedure is likely to be too long in order to be set up quickly enough when the active period resumes, which results in undesirable voice quality.

An example of the resource allocation in the GPRS of the current GSM Phase 2+ specification is next described in more detail.

In the GSM Phase 2+ the uplink resource allocation is currently specified as follows: The Mobile Station (MS) requests uplink radio resources by sending a PACKET CHANNEL REQUEST message to the network. Various access type values are specified for the request message. For data transfer 'one phase access', 'two phase access' and 'short access' type values are defined. Using 'short access' type value, the MS may request the radio resources to transfer only a few RLC data blocks, and therefore it is not applicable for transferring continuous data flows.

When a network receives a PACKET CHANNEL REQUEST message indicating one phase access, it may allocate radio resources on one or several Packet Data Channels (PDCH). The allocation is based on information included in the request message. The following table shows an example for an 11 bit message content of a PACKET CHANNEL REQUEST message:

| bits | | | | | | | | | | | Packet Channel |
|---|---|---|---|---|---|---|---|---|---|---|---|
| 11 | 10 | 9 | 8 | 7 | 6 | 5 | 4 | 3 | 2 | 1 | Access |
| 0 | m | m | m | m | m | p | p | r | r | r | One Phase Access Request <MultislotClass: bit (5)> <Priority: bit (3)> <RandomBits: bit (3)> |
| 1 | 0 | 0 | n | n | n | p | p | r | r | r | Short Access Request <NoOfBlocks: bit (3)> <Priority: bit (2)> <RandomBits: bit (3)> |
| 1 | 1 | 0 | 0 | 0 | 0 | p | p | r | r | r | Two Phase Access Request <Priority: bit (2)> <RandomBits: bit (3)> |
| 1 | 1 | 0 | 0 | 0 | 1 | r | r | r | r | r | Page Response <RandomBits: bit (5)> |
| 1 | 1 | 0 | 0 | 1 | 0 | r | r | r | r | r | Cell Update <RandomBits: bit (5)> |
| 1 | 1 | 0 | 0 | 1 | 1 | r | r | r | r | r | Mobility Management Procedure <RandomBits: bit (6)> |
| 1 | 1 | 0 | 1 | 0 | 0 | r | r | r | r | r | Single Block Without TBF Establishment <RandomBits: bit (5)> |
| All others | | | | | | | | | | | Reserved |

An 11 bit PACKET CHANNEL REQUEST message indicating one phase access has a field of 5 bits describing the multislot class of the mobile station, a field of two bits indicating requested priority and a field of three bits describing random reference (random mobile station identification information).

The following table shows an example for an 8 bit message content of a PACKET CHANNEL REQUEST message:

| | | | bits | | | | | |
|---|---|---|---|---|---|---|---|---|
| 8 | 7 | 6 | 5 | 4 | 3 | 2 | 1 | Packet Channel Access |
| 1 | m | m | m | m | m | r | r | One phase Access Request <MultislotClass: bit (5)> <RandomBits: bit (2)> |
| 0 | 0 | n | n | n | r | r | r | Short Access Request <NoOfBlocks: bit (3)> <Randombits: bit (3)> |
| 0 | 1 | 0 | 0 | 0 | r | r | r | Two Phase Access Request <RandomBits: bit (3)> |
| 0 | 1 | 0 | 0 | 1 | r | r | r | Page Response <RandomBits: bit (3)> |
| 0 | 1 | 0 | 1 | 0 | r | r | r | Cell Update <RandomBits: bit (3)> |
| 0 | 1 | 0 | 1 | 1 | r | r | r | Mobility Management Procedure <RandomBits: bit (3)> |
| 0 | 1 | 1 | 0 | 0 | r | r | r | Single Block Without TBF Establishment <RandomBits: bit (3)> |
| All others | | | | | | | | Reserved |

An 8 bit Packet Channel Request message indicating one phase access has a field of 5 bits describing the multislot class of the mobile station and a field of two bits describing random reference. The information about the allocated radio resources is sent to the Mobile Station with a PACKET UPLINK ASSIGNMENT message.

When a network receives a PACKET CHANNEL REQUEST message indicating two phase access, it may allocate limited radio resource on one packet data channel. The allocated radio resources are transmitted to the mobile station with a PACKET UPLINK ASSIGNMENT message. After this allocation the mobile station transmits a PACKET RESOURCE REQUEST message to the network by using the allocated radio resource. The message defines more accurately the required radio resources, e.g. requested bandwidth and priority, and the radio capability of the mobile station. Based on the information received in the PACKET RESOURCE REQUEST message, the network may assign one or several packet data channels to the TBF and informs the assigned radio resources to the mobile station with a PACKET UPLINK ASSIGNMENT message.

In such a configuration, the request of resources is made using the GPRS control channel as an example. There are also other ways of requesting resources in case the cell does not include a GPRS control channel (even if it supports GPRS). In this case the resource request can be made using a GSM control channel.

In the prior art the uplink radio resource allocation could cause the following problems:

If the priority field included in the PACKET CHANNEL REQUEST and the PACKET RESOURCE REQUEST messages does not define the characteristics of the data to be transmitted (e.g. delay sensitive real-time traffic), the network might not be able to provide the needed radio resources for the MS. Thus, e.g. transferring speech using the GPRS might not reach a sufficient quality.

The default RLC mode is an acknowledged mode in one phase access. Since real-time traffic would be transferred using unacknowledged RLC mode, two phase access should be used. Using two phase access, additional radio resource request information may be given to the network. However, two phase access causes additional delay to the channel assignment procedure, because the mobile station has to send two request messages to the network instead of one. In spite of the additional radio resource request information it is not guaranteed that the network is able to provide the needed radio resources for the mobile station transferring delay sensitive real-time traffic.

When allocating radio resources for uplink transfer, downlink radio resources cannot be allocated simultaneously, because the downlink Temporary Block Flow (TBF) cannot be created without downlink packets. Thus it is possible, when the mobile station is to receive a downlink packet, the network is unable to assign radio resources for the transfer of the packet.

Downlink radio resource allocation is currently specified as follows: When the network receives data for a mobile station which has no assigned radio resources and whose cell location is known, the network assigns radio resources on one or several packet data channels by transmitting a PACKET DOWNLINK ASSIGNMENT message to the mobile station. When the mobile station receives the assignment message, it starts listening to the allocated packet data channels for Radio Link Control (RLC) data blocks.

In downlink radio resource allocation, the following problems may arise:

If information attached to data (coming from the SGSN) does not define the characteristics of the data to be transmitted (e.g. delay sensitive real-time traffic), the network may not be able to provide the needed downlink radio resources for the MS.

Also if there is a need to transfer e.g. delay sensitive real-time traffic in both directions, downlink and uplink, the mobile station may request uplink radio resources only when the network assigns sending permission to the mobile station. This may cause a delay of a variable amount of time, such as several seconds.

When allocating radio resources for downlink transfer, uplink radio resources cannot be allocated simultaneously because the uplink Temporary Block Flow cannot be created without uplink packets. Thus it is possible, that the mobile station may request uplink radio resources but the network is unable to assign the requested radio resources.

Uplink radio resource deallocation is currently specified as follows: Every uplink RLC data block includes a countdown value (CV) field. It is specified in reference [1] (see Table 1) that the CV shall be 15 when the mobile station has more than BS_CV_MAX (broadcast parameter) RLC data blocks left to be transmitted to the network. Otherwise the mobile station indicates to the network the number of remaining RLC data blocks with the CV field. The last RLC data block is sent to the network with the CV value set to '0'. Reference [1] also defines that once the mobile station has sent a CV value other than '15', it shall not enqueue any new RLC data blocks; meaning that the new RLC data blocks shall not be sent during the ongoing TBF. Once the network receives RLC data block with the CV field set to '0', the TBF release procedures are initiated.

In uplink radio resource deallocation, the following problems may arise:

If e.g. delay sensitive real-time data is transferred over radio interface according to current GPRS rules, the mobile station has to establish several TBFs per session, because during the passive periods the mobile station has no RLC data blocks to send to the network and thus the CV value '0' terminates the uplink TBF. Because the TBF setup procedures takes time, delay sensitive traffic cannot be transmitted with good quality. Also, there are no guarantees that free radio resources are always available when the mobile station requests uplink radio resources.

Downlink radio resource deallocation is currently specified as follows: Every downlink RLC data block includes a Final Block Indicator (FBI) field in the RLC header. Reference [1] defines that the network indicates to the mobile station the release of the downlink TBF by setting the FBI field to '1'. The network sets the FBI field to '1' when it has no more RLC data blocks to send to the mobile station. After receiving RLC data block with FBI field set to '1' the mobile station shall acknowledge to the network that it has received the FBI information. When the network receives the acknowledgement message, the TBF is released.

In downlink radio resource deallocation, the following problems may arise:

If e.g. delay sensitive real-time traffic is transferred over radio interface according to current GPRS rules, the network has to establish several TBFs per session, because during the passive periods the network has no RLC data blocks to send to the mobile station and thus the FBI value '1' terminates the downlink TBF. Also, there are no guarantees that free radio resources are always available when the network tries to allocate downlink radio resources.

Problems also occur in assigning uplink and downlink sending permissions: If e.g. delay sensitive real-time data traffic is transferred on packet data channel/channels (PDCH), it is not guaranteed that adequate sending permissions are given in order to transfer the data, because the current network may not have knowledge about the characteristics of the transferred data (e.g. delay sensitive data).

A further problem with the prior art specification is related to the feature that the network assigns transmission permissions for uplink and downlink directions independently, i.e. controls which mobile station receives data next and which mobile station may send data next. However, some types of application generated data, e.g. delay sensitive data associated with speech, have strict delay requirements. Consequently, whenever such a delay sensitive data user has something to transmit, it must be able to do so in order to maintain an acceptable service level. If more than one user is allocated to the same packet data channel it is probable that at some point two or more users will need to transmit simultaneously, and just one can be served on the channel. In speech conversations a large proportion of the connection time is silence. Thus it would be possible to statistically multiplex more than one speech user for one packet data channel. The GPRS channel reservation system, however, is not elaborate enough to support this need. Therefore only one user of delay sensitive data transfer can be allocated for one packet channel, which means that the usage of the channel capacity is not optimized.

When the network notices that a mobile station wants to send e,g, delay sensitive data in the uplink direction the network reserves as much uplink resources to the mobile station as is requested. This naturally requires that the network has the required resources available. Such allocation may mean that the packet data channel is dedicated temporarily to a single mobile station in the uplink direction. During passive periods in such uplink delay sensitive data transfer, the network may assign uplink sending permissions of the allocated channels to other mobile stations. Since the mobile station transferring e.g. delay sensitive data reserves the uplink capacity of the packet data channel, other mobile stations that are allocated to the same packet data channel cannot be assigned a sending permission to determine whether they have data to send in the uplink direction. Also, if more than one mobile station allocated to the same packet data channel needs to send e.g. delay sensitive data at the same time, only one can be served. Therefore the network is forced to restrict the number of mobile stations transferring e.g. delay sensitive data according to the number of packet data channels in order to provide acceptable service quality.

RLC/MAC LAYER TBF CONTROL

One technique to resolve these problems is where the physical connection of a packet radio service is kept reserved during the passive periods of a session yet the same physical resource can still be shared between multiple users. In this procedure, a TBF is also kept functional when there is nothing to transfer between the mobile station and the network. The procedure in general supports traffic types which have inactive periods between active transmission. The procedure is especially beneficial for real time services which do not tolerate TBF setup delays.

Thus the network may be informed at the end of an active period, as to whether a passive period follows the active period (and therefore the connection should not be released since at least one more active period is to follow) or if the connection can be released (no more active periods are to follow). The network may also be informed as to whether the packet data channel can be assigned to other Temporary Block Flows. The information can be transferred e.g. on the packet data channel during an active period or on a control channel at any time. On the packet data channel the information can be transferred e.g. in the MAC header field of a data block. Alternatively a separate signalling message can be used. With this information it is possible to keep the created Temporary Block Flow available even when there is no data to be transmitted. When an active period starts after a passive period, the connection starts using the created TBF again, and possible other users of the packet data channel may be assigned to other channels.

In general, the TBF can be controlled using one of a plurality of methodologies. Thus TBF can be left on until control information is signalled concerning its release or if a maximum hold timer (e.g. up to 10 minutes) expires. At such occurrences, the TBF is released. One alternative is that the TBF is set up in the MAC layer. A second alternative is that the application layer sets the TBF to stay on. A third alternative is that the release of the TBF may be placed in the data field in which information of the end is expressed or that a separate data packet is sent (in the data channel), or that a separate data packet is sent in the signalling channel, or that a timer is used (the expiration of which initiates the release of the TBF).

In another technique to solve these problems several traffic type (e.g. delay sensitive) data flows are allocated to the same packet data channel. On an uplink channel, after one mobile station starts to transmit, the other mobile stations may be reallocated to other channels immediately or a transmission permit can be periodically allocated to the mobile stations so that the mobile stations may indicate their willingness to transfer. On a downlink channel, after one mobile stations starts to transmit, the other mobile stations may be reallocated to other channels immediately as well or the data may not be transferred until another mobile station starts to receive data on the same channel.

In addition the network can also be informed of a need to allocate a TBF in the opposite data transfer direction. For example, when uplink TBF is allocated, the downlink TBF is also allocated even if no downlink data is to be transferred at the moment. This information can be transferred in a signalling message as a separate information element or in an information element for another purpose. The temporary data flows can also be allocated automatically in both data transfer directions (e.g. during a connection establishment phase), when the data is a traffic type (e.g. delay sensitive).

SUMMARY OF THE INVENTION

Application Layer TBF Control

It is thus an object of the present invention to overcome the problem wherein the Temporary Block Flow is released when the data buffer becomes empty as specified in the R97 and 99 GPRS RLC/MAC standard (reference [2]). This particular problem is with regard to applications where the transmission consists of multiple transmission periods separated by silent periods. This is particularly a problem for voice service because during a conversation, there are often many silent and active periods that vary from milliseconds to tens of seconds. According to current specifications, the TBF must separately set up for each active period and it is torn down when the silent period begins. This tearing down of the TBF is a problem because the TBF setup procedure is relatively long and it causes unnecessary signalling to occur. Consequently, the solution presented in the current GPRS RLC/MAC standard for many applications such as voice, telnet, multi-media, etc. is not particularly advantageous.

Furthermore, currently the Enhanced Data Rates for Global Evolution (EDGE), Phase II standardization is in the process of being implemented. There is an intensive discussion concerning the design and standardization of GSM/EDGE based radio accessed network (EGPRS) that would interface to the same core network as Wideband CDMA (WCDMA) based UMTS Terrestrial Radio Access Network (UTRAN). In GSM/EDGE RAN real-time voice connections are carried over a packet switched radio interface. Thus in order to achieve successful use of these technologies for real-time and other traffic type applications having inactive periods between active transmission, a method must be determined for minimizing the unnecessary tear down of TBF.

Thus the object of the present invention builds upon the solution previously mentioned wherein the RLC/MAC layer is covered. In the present invention, the higher level signalling messages are used so as to participate in the triggering of a special type TBF setup and as a trigger to participate in the release of such a special type TBF. The information is transferred to the lower layers through the protocol stack via specific primitives.

In summary, the present invention is particularly beneficial, and in some respects, essential, for data transfer that has active periods and relatively short inactive periods. In the case of voice communication being transferred, it is extremely important that TBF be kept on all the time in order not to require the re-establishment of TBFs over and over again due to pauses in speech. With regard to voice communication, TBF establishment would therefore introduce too much delay if TBFs were to be released during silent periods and consequently the quality of voice communication would be unacceptable.

In the case of interactive data transfers (such as telnet), delay requirements are not the same as with respect to transferring speech since the application would continue to operate even if there were slower responses due to release of TBF. However by keeping TBF on even when there is nothing to send for such an application, results in minimization of common control channel (CCCH) usage (common resource), and packet common control channel (PCCCH) and would of course make the usage of telnet in other similar applications much more comfortable due to fewer delays before data could be transmitted.

Therefore, basically the idea of the present invention is that TBF is not released immediately after the radio link control (RLC) buffer becomes empty, since some applications, especially speech, require that the communication path be maintained even during silent periods.

Throughout the specification reference is made to delay sensitive data and it should be noted that this refers to a subset of traffic type data which has inactive periods between active periods.

The description contained herein therefore primarily deals with transferring data that has relatively short inactive periods (no data to be transmitted) between active periods with delay sensitive real-time data transfer being presented as a particular example of such data transfers.

In addition, the enclosed description contains sections specific to delay sensitive real-time data transfer. It should further be noted that in UMTS traffic class or traffic type, there typically are four categories; namely, conversational, streaming, interactive and background. Therefore for instance, delay sensitive real-time data carrying voice could be considered to belong to conversational traffic class. Conversational traffic class has certain requirements with respect to data transfer such as low delay and sufficient capacity reservation so as to maintain data communication paths even when relatively long time delays occur due to e.g. voice silence. Interactive traffic class does not have such strict delay nor capacity requirements but nevertheless could benefit from such as low delay (when there is no need to establish TBFs constantly).

In GPRS there is no clear division of traffic classes due to the use of Quality of Service (QoS) which typically has five different parameters and a number of different variations which can be used for adjusting these parameters.

Consequently, the idea set forth herein is that there are different types of data that can be categorized into different groups. For example, if UMTS traffic class categories are used, voice, real-time video, etc. could be in conversational class, whereas video clips or network radio could be in the streaming class, while web browsing and telnet could be in the interactive class and finally, E-mail and FTP (file transfer protocol) could be in the background class. However, in current GPRS the division is typically different and would be based on the defined parameter set so that certain combinations of QoS bits are interpreted as a certain type of traffic (e.g. the interpretation could be that with a specific bit combination, real-time data connection is assumed where in between active periods there are silent intervals during which there is no data to be transmitted, such as for voice communication). Therefore as set forth herein, the new TBF release procedure described can be used for a specific traffic type (such as the four UMTS traffic classes discussed above), as well as other traffic types that use existing or other TBF release modes. In any event, it should be noted that any class could be chosen for use with respect to a specific TBF release procedure. In addition, it would be feasible that all traffic classes could have a new TBF release so that the TBF would be kept on throughout the connection (including during silent periods) and would be released only in the event that an end of connection with respect to a specific message is received or if a long timeout is exceeded (no data packets received for a long period of time).

Thus the object of the present invention is to provide a method in which an application carried over GPRS (such as voice, telnet or web browsing in some instances such as streaming audio or video) may trigger a special type of TBF wherein the setup and release mode of the TBF may be defined and signalled from the upper layer protocol application to the RLC/MAC layer in order to participate in the triggering of the TBF control event according to application requirements. Therefore applications where transmissions consist of multiple transmission periods separated by silent periods do not lose the TBFs seized for their use during such silent periods, but instead of unnecessarily releasing the TBF, the upper layer protocol can choose a particular type of TBF release mode which best suits the application and thus frequent TBF setup and release procedures and signalling thereby required are greatly diminished.

BRIEF DESCRIPTION OF THE DRAWINGS

FIG. 11b is a flow chart of TBF setup using a modification of the notification method shown in FIG. 11a.

DETAILED DESCRIPTION

Introduction

Figure 1A:
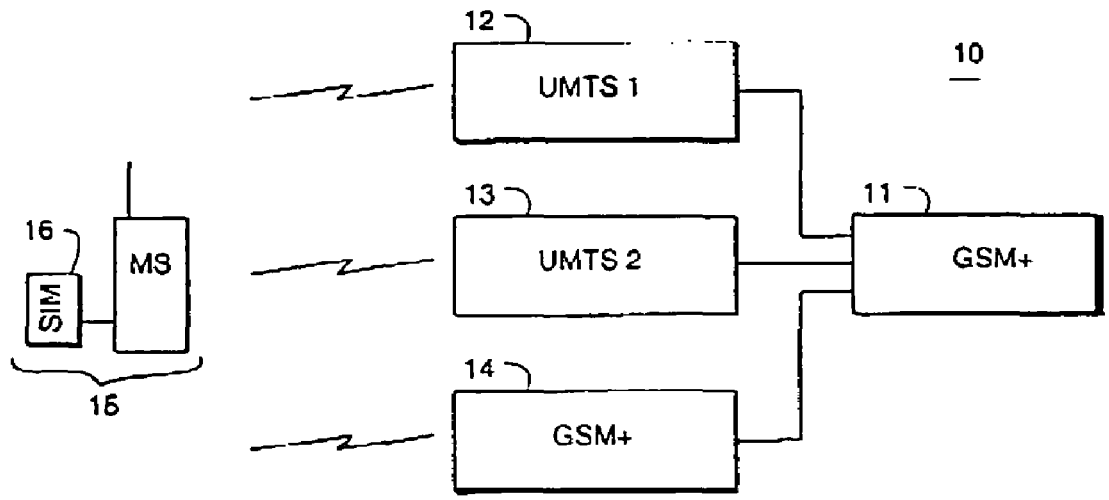
FIGS. 1a and 1b illustrate a prior art cellular communications system.
Figure 1B:
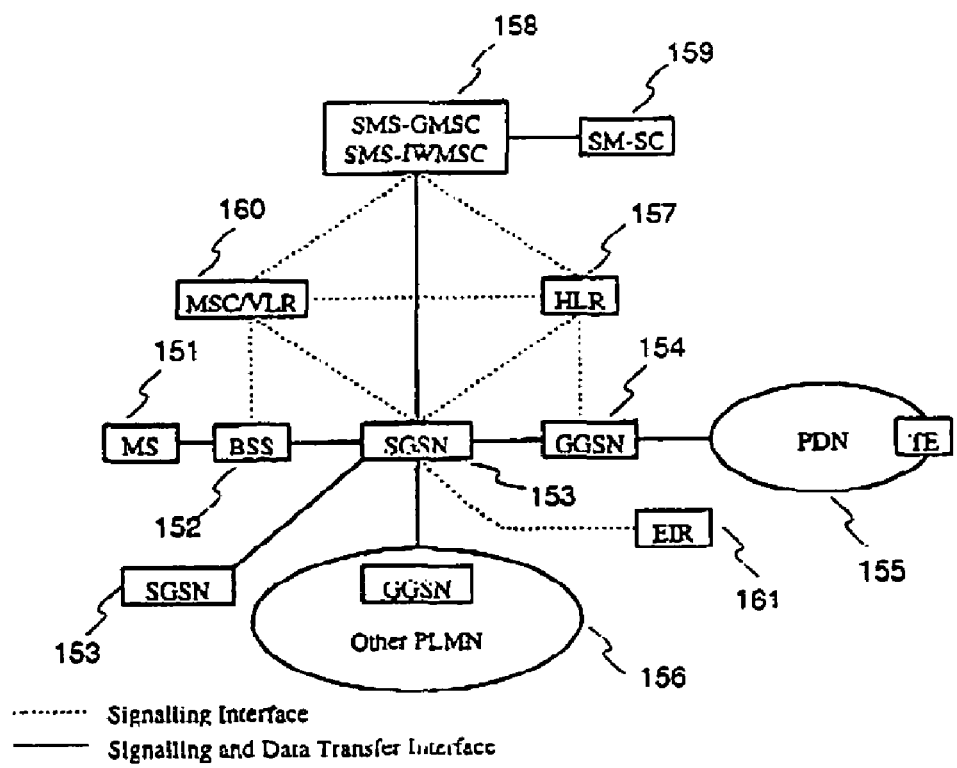
Figure 1C:
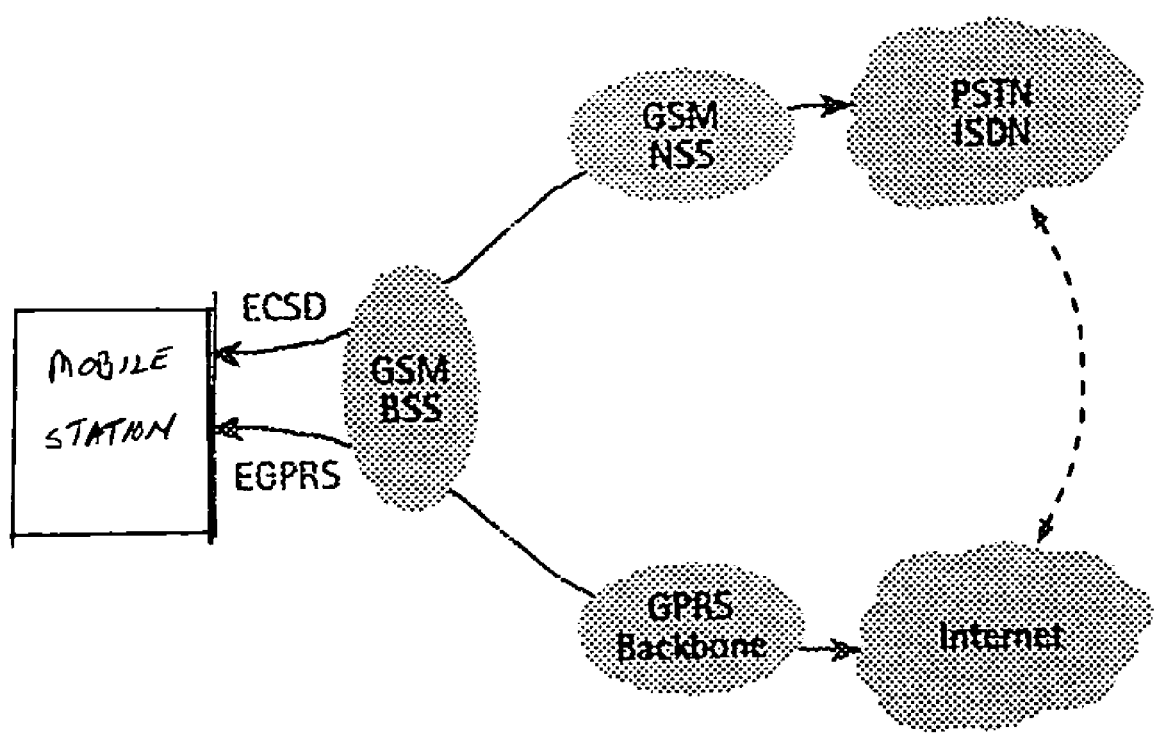
FIG. 1c illustrates a GSM Edge Radio Access Network.
Figure 2:
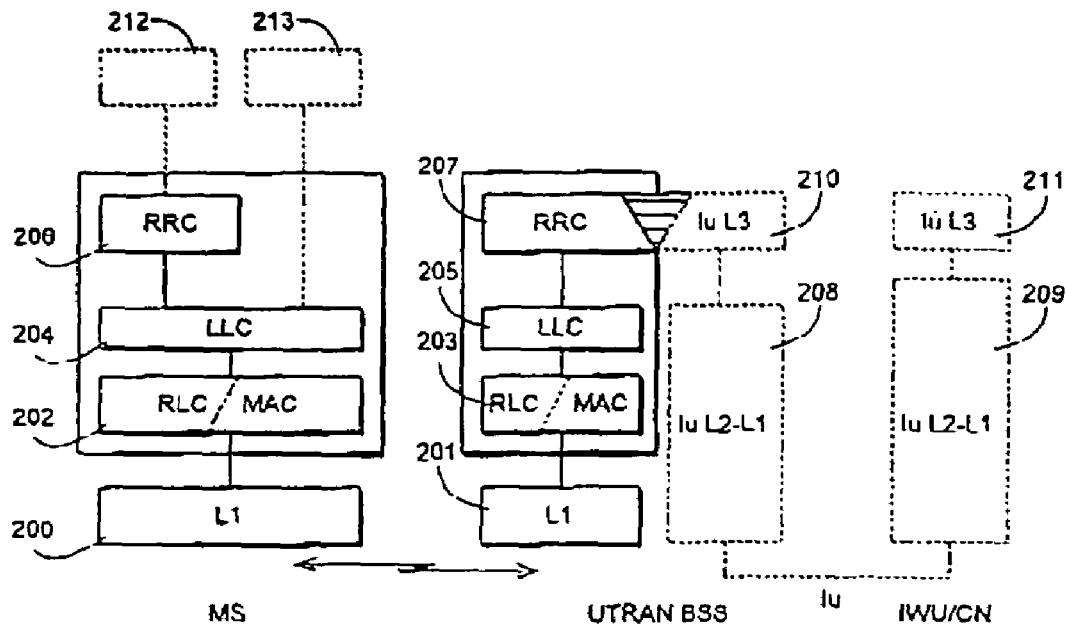
FIG. 2 illustrates protocol levels of a prior art cellular communications system.

FIGS. 1a, 1b and 2 were previously described in the prior art description. In the following, principles of indicating specific traffic type (e.g. delay sensitive data) and of allocating resources are first described using an embodiment in a GRPS system as an example. Next a description is given with respect to Temporary Block Flow (TBF) setup and release control at the RLC/MAC layer. In this section the placing of the release information into the MAC header is described with reference to FIGS. 3, 4a and 4b. The steps of this method are described with reference to FIGS. 5–9. Then a mobile station and a cellular system with respect to this section are described with references to FIG. 10. The details of the present application layer control of the setup and release of Temporary Block Flow (TBF) is then presented with reference to FIGS. 11a–16.

RLC/MAC TBF Control

In an uplink resource allocation, a mobile station indicates to the network that it requires radio resources for specific traffic type (e.g. delay sensitive data) transfer. The network needs the information in order to assign sufficient radio resources for the mobile station to provide the required service level. The information may be provided to the network via one of the following ways, where some system specific message denominations are used as examples with no intention to limit the applicability of the disclosure:

The mobile station sends a PACKET CHANNEL REQUEST message to the network, and the message is of a specific type that is used to identify the specific traffic type (e.g. a delay sensitive data) transfer;

CHANNEL REQUEST DESCRIPTION information element or other corresponding information element is included in a PACKET RESOURCE REQUEST message and this information element includes information indicating the specific traffic type (e.g. delay sensitive data) to be transferred or;

A priority field or other field is included in the radio resource request message, such as a PACKET CHANNEL REQUEST or a PACKET RESOURCE REQUEST message, that is transmitted by the mobile station to the network and the field identifies the traffic type to be transferred.

In addition to the information regarding radio resources that are required for the specific traffic type (e.g. delay sensitive) data transfer, the radio request information may also include the following additional parameters that specify more accurately the required resources;

The number of required packet data channels;

The information on whether the communication is unidirectional or bidirectional. This information makes the network able to determine whether the mobile station also requires downlink resources. By reserving downlink resources simultaneously with the uplink radio resources it is possible to avoid a situation where the mobile station would receive downlink data but the network is unable to reserve downlink radio resources at that moment;

First Mechanism—Uplink State Flag (USF): When an inactive period begins, the network "polls" (assigns sending permission using USF), the mobile station every Nth block period whether the mobile station has data to be transmitted or not.

Second mechanism, notification from the mobile station: When an inactive period begins, the mobile station notifies the network when it has more data to be transmitted. This notification is made by sending a control message to the network (e.g. RACH message). There is no need for the network to poll the mobile station when this mechanism is used. This mechanism therefore does not use the concept of N passive block periods.

Thus there are basically two methods by which a network can receive information concerning whether a specific mobile station has become active. In the first method, the network "asks" whether the mobile station has something to send. The allocation every Nth block for the user represents this asking process.

In the second method, the mobile station notifies the network that it has something to send. It can do this such as by using a random access channel (RACH channel).

Thus the MS notification method does not require the allocation of the Nth block since the mobile station simply notifies the network when it has data to send. In the case where the network "asks" whether the MS has something to send, the polling or asking if the MS has something to send is used to obtain the information as to whether the MS has become active. The USF based signalling of uplink transmission permissions is a GPRS specific implementation which is currently being used. Other polling methods could of course be used.

As the length of the PACKET CHANNEL REQUEST message is only 11 or 8 bits, it may be difficult to include the above parameters into the message. Therefore it may be preferable to use two phase (step) access when requesting radio resources for specific traffic type (e.g. delay sensitive) data transfer, if a more accurate description of the requested radio resources is necessary.

There may also be default values for the channel request when one phase access is used. For example, when requesting radio resources for delay sensitive data transfer one packet data channel and only uplink radio resources could be reserved as a default. If there is a need to reserve several packet data channels the modification of the radio resources can then take place through an additional signalling procedure.

In a downlink resource allocation, the procedure starts when the network needs to transmit data to the mobile station that has no downlink radio resources assigned or when the mobile station requests the establishment of a downlink TBF during uplink TBF establishment procedure. The network allocates sufficient radio resources based on the information that is attached to the packet data. The information includes an indication that radio resources are required for specific traffic type (e.g. delay sensitive real time traffic) data transfer so that the network can assign sufficient radio resources in order to provide the required service level. For example, the traffic type requirements of the data may be indicated in an information element included in the Quality of Service (QoS) profile. Delay sensitivity of the data transfer may also be indicated in a new field in the QoS profile or in a new information element that is attached to the data sent from the network, e.g. from a SGSN, to the BSS.

In addition the following parameters may be included in the information that is received from the SGSN in order to describe the required radio resources more accurately:

The number of required packet data channels;
The information on whether the communication is unidirectional or bidirectional. This makes the network able to determine whether the mobile station also requires uplink radio resources. By reserving downlink resources simultaneously with the uplink radio resources it is possible to avoid a situation where the mobile station would need to send uplink data but the network is unable to reserve uplink radio resources at that moment.

As discussed above, a USF "polling" technique or a notification technique can be used.

Figure 3:
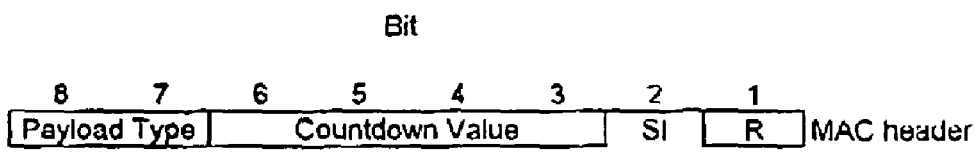
FIG. 3 illustrates a prior art MAC header in an uplink RLC data block.

FIG. 3 describes a prior art MAC header in an uplink RLC data block currently specified in reference [1] (see Table 1). In the header the Payload Type field indicates the type of data contained in remainder of the RLC/MAC block. The Countdown Value field CV is sent by the mobile station to allow the network to calculate the number of RLC data blocks remaining for the current uplink TBF. This procedure was discussed above.

The Stall Indicator (SI) bit indicates whether the RLC transmit window of the mobile station can advance, i.e. the RLC transmit window is not stalled, or whether it cannot advance, i.e. the RLC transmit window is stalled. The mobile station sets the SI bit in all uplink RLC data blocks. In RLC unacknowledged mode SI is always to be set to '0'.

The Retry (R) bit indicates whether the mobile station transmitted the PACKET CHANNEL REQUEST message once or more than one time during its most recent channel access.

When specific traffic type data (in the above description data having inactive periods between active periods) is transmitted from the mobile station to the network the RLC/MAC data block may include a field indicating if the RLC block is the last one of the connection or if it is not. This field is called TBF Release (TR) in this text. If the RLC block is the last one, the TR field is set to value "1" and the TBF is considered to be released. Otherwise the TR field is set to "0" and the network considers the TBF to be open. The TR field may replace the stall indicator SI field, because when the RLC operates in unacknowledged mode the SI field is not used. The TR field may also be included in the CV field by replacing a part of it.

When such specific traffic type data is transmitted to the network, the RLC/MAC data block includes information regarding whether the mobile station has more RLC data blocks to be transmitted or if the network may give the next N uplink permissions to other mobile stations.

For example, this information may also be provided to the network in the RLC/MAC header and the field is called "CV'" herein. The CV' field may replace all or part of the CV field in the prior art specification.

In such an example, when the mobile station transfers specific traffic type data (data having inactive periods between active periods) to the network and CV'≠0, the network interprets it to mean that the mobile station has more data blocks to be transmitted and the network is thus able to also assign the next uplink transmit permissions for the same mobile station. When the CV' value is set to "0" the network interprets it to mean that the first mobile station has no more RLC data blocks to be transmitted at that time and the network may therefore give the next N uplink transmit permissions to some other mobile station/stations. However, in order to guarantee that the first mobile station transferring specific traffic type data does not need to wait too long for an uplink transmit permission, the network gives at every N block period an uplink transmit period for the first mobile station in case the polling mechanism is used. Of course, if the notification mechanism is used, the mobile station notifies the network when it has no more data to be transmitted. If the mobile station then has RLC data blocks to be transmitted, the mobile station includes RT and CV' fields in the RLC data blocks as described above. If the mobile station does not have data to be transmitted to the network at that time, the mobile station may omit the uplink transmit permission or it may transmit a Packet Dummy Control Block or a signalling message.

If the downlink Temporary Block Flow is also preserved when there is no data to be transmitted to the mobile station and if the network is unable to determine when to release the downlink TBF, the mobile station should notify the network when the downlink TBF can be released. This can be accomplished by introducing a bit in the RLC/MAC data block header that indicates whether the network is to release both uplink and downlink Temporary Block Flows. The mobile station may also transmit a RLC/MAC control signalling message to the network indicating the release of downlink Temporary Block Flow prior to the release of the uplink Temporary Block Flow. It is also possible to have a timer function which would release the downlink Temporary Block Flow after a predetermined time has passed from the latest transmission of downlink data. The network may contain a logical entity that is able to determine, when the TBF is to be released.

Figure 4A:
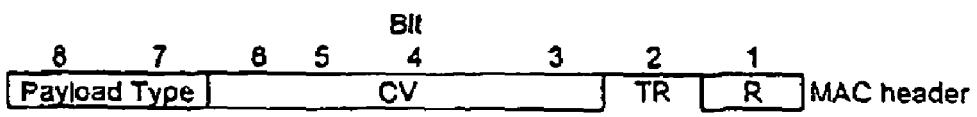
FIG. 4a illustrates a MAC header in an uplink RLC data block without a TBF release indication.

FIG. 4a describes an example of the MAC header in an uplink RLC data block, without including a downlink TBF release indication. The TBF Release (TR) indicates whether the mobile station transferring delay sensitive data requests the release of uplink TBF or not.

Figure 4B:
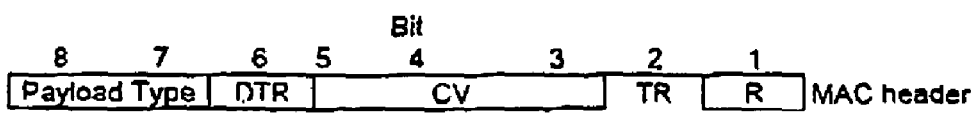
FIG. 4b illustrates a MAC header in an uplink RLC data block with a TBF release indication.

FIG. 4b describes an example of the MAC header in uplink RLC data block including Downlink TBF Release indication DTR in bit 6 of the header. The downlink TBF release indicates whether or not the mobile station transferring delay sensitive data also requests the release of downlink TBF. The DTR field, if used, may be present in all uplink RLC data blocks thus occupying e.g. one Count Value CV' field bit. DTR field may actually be included in the MAC header only when CV' field is set to '0' (actually three LSBs) and TR field is set to '1', thus leaving 4 bits for CV' field in normal operation.

The parameters as described can be included into the current uplink RLC/MAC data block as described above, or a new RLC/MAC data block may be defined. If a new data block is defined, the Payload Type may be used for identifying the type of the block.

Figure 5:
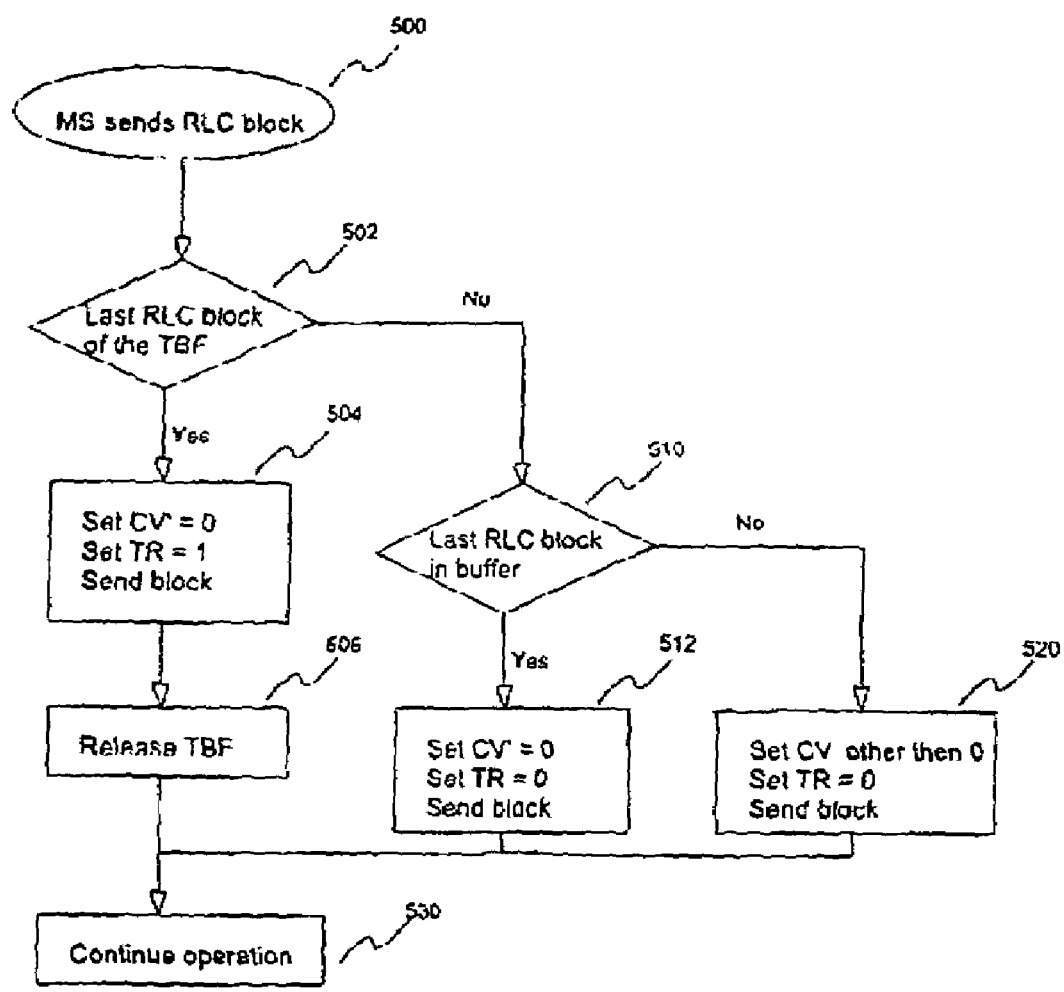
FIG. 5 illustrates a flow diagram for the transmission of the uplink RLC blocks.

FIG. 5 shows a flow diagram of the steps for transmitting a RLC block from a mobile station to the network, 500. The following parameters of a MAC header field are given as examples; many other ways of transferring the information can be applied. In step 502, the mobile station checks whether the RLC block to be transmitted is the last one in a data block of the TBF. If it is, the mobile station sets the parameters CV'=0 and TR=1 of the MAC header, step 504, and transmits the block. The parameter TR=1 means that the TBF can be released, step 506.

If in step 502 the RLC block is not the last one of the TBF, the mobile station checks in step 510, whether the RLC block is the last one in the buffer. If it is, the mobile station sets the parameters CV'=0 and TR=0 in step 512 and transmits the block. This means that the data flow starts a passive period, but the TBF is not released. If the RLC block is not the last one in the buffer of the mobile station, the parameters are set CV'=other than 0 and TR=0 in step 520, and the block is transmitted. The CV' value can be the number of the remaining blocks in the buffer, if the number is small enough to be expressed in CV'. For example, the CV' can be used as the CV parameter in the current specification (see ETSI GSM 06.60).

After the block is transmitted in any of the previous steps, the operation is continued from step 500, when there is a data block in the buffer to be transmitted, 530.

Figure 6:
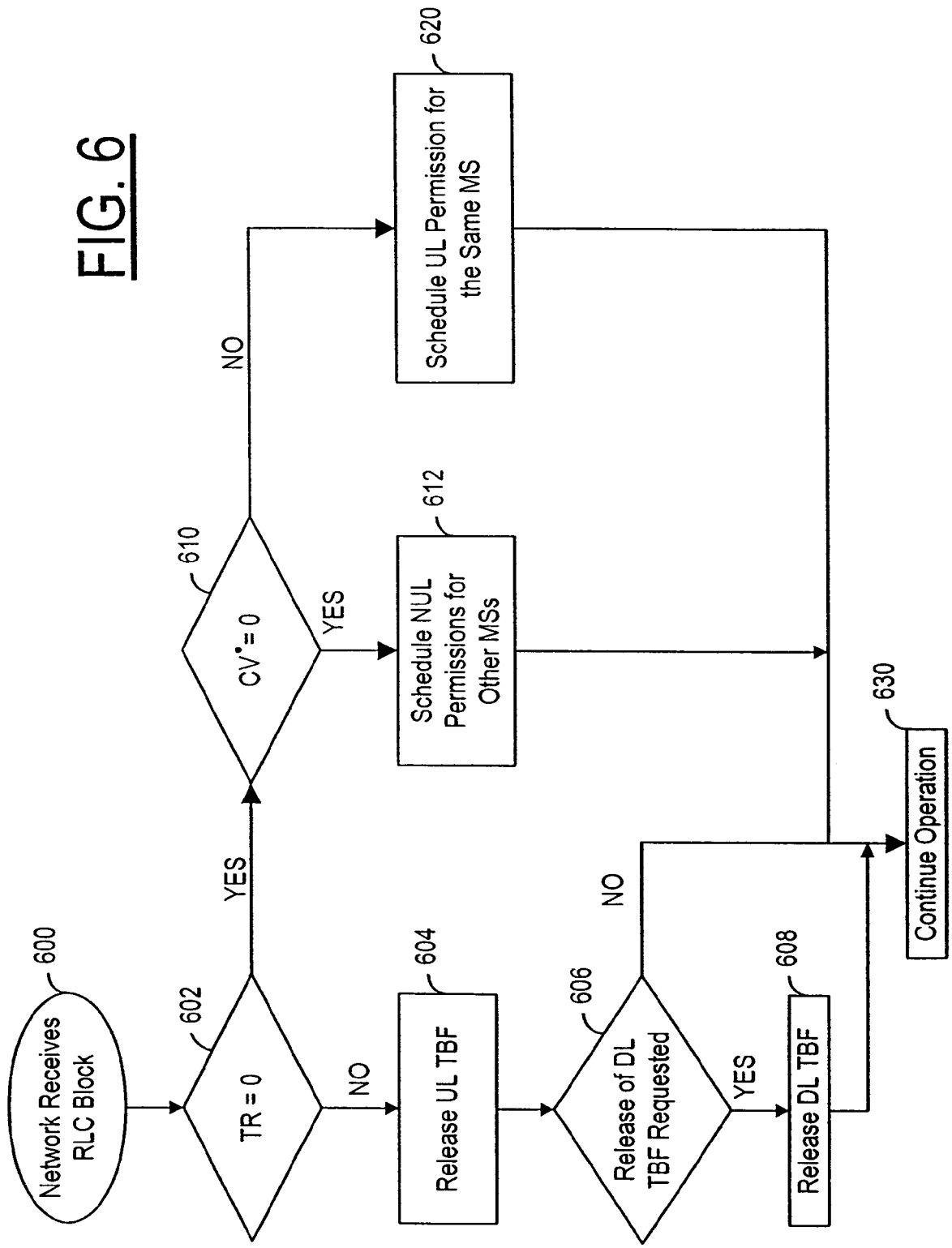
FIG. 6 illustrates a flow diagram for the reception of the uplink RLC blocks.

FIG. 6 shows a flow diagram of the steps for receiving a RLC block from a mobile station to the network, 600. In step 602 the network checks the value of the TR parameter from the received RLC block. If the parameter TR=1, the uplink TBF is released, step 604. Next, the release of the downlink TBF depends on whether it is requested, steps 606 and 608.

If in step 602 the parameter TR=0, the network next checks the value of the parameter CV', step 610. If CV'=0, this means that there is a passive transfer period in the data flow, and the packet data channel may be scheduled for another mobile station (other mobile stations), step 612. If, however, the parameter CV' is different from 0, the channel permission is scheduled for the same mobile station, step 620.

After the block is received and processed in the previous steps, 630, the operation is continued from step 600, when there is a new data block received.

Figure 7:
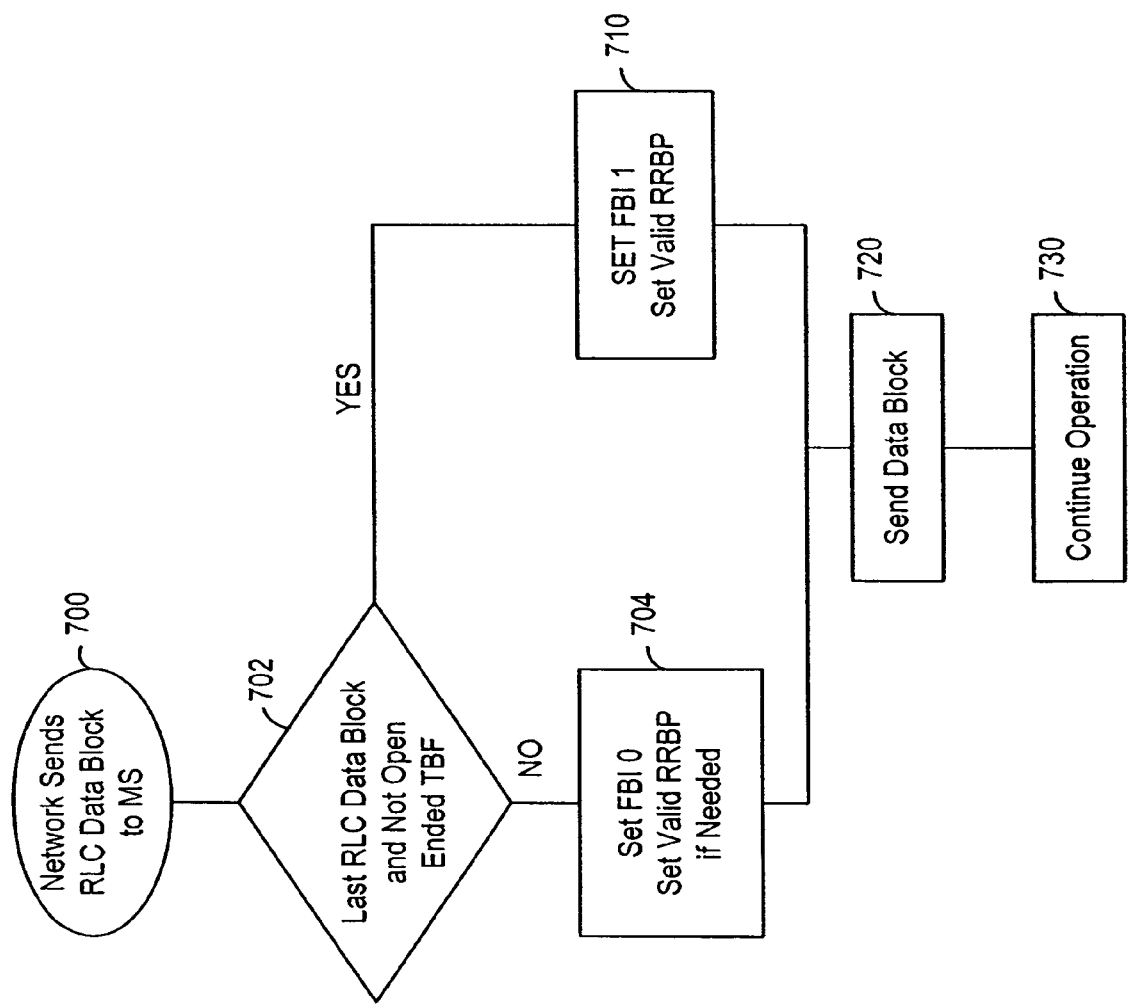
FIG. 7 illustrates a flow diagram for the transmission of the downlink RLC blocks.

FIG. 7 shows a flow diagram for the transmission of the RLC blocks from the network to the mobile station, 700. In step 702, the network checks whether the RLC block to be transmitted is the last one in a data block of the TBF. If it is, the network sets the parameter Final Block Indicator FBI=1. It also sets a valid Relative Reserve Block Period (RRBP) field, step 710, and transmits the block, step 720. The parameter FBI=1 means that the current block is the last RLC block in the temporary block field and thus the TBF can be released. The allocation of a RRBP field means that one uplink transmit block is allocated for the receiving mobile station so that the mobile station can send a control message to the network indicating the reception of RLC data block with FBI=1.

If in step 702 the RLC block is not the last one of the TBF, the network sets the parameter FBI=0 in step 704. This means that the data flow may or may not start a passive period, but the TBF is not released. The network also sets a valid RRBP if needed, step 704.

After this, the network transmits the data block, step 720. After the block is transmitted in any of the previous steps, the operation continued from step 700, when there is a data block in the buffer to be transmitted, 730.

Figure 8:
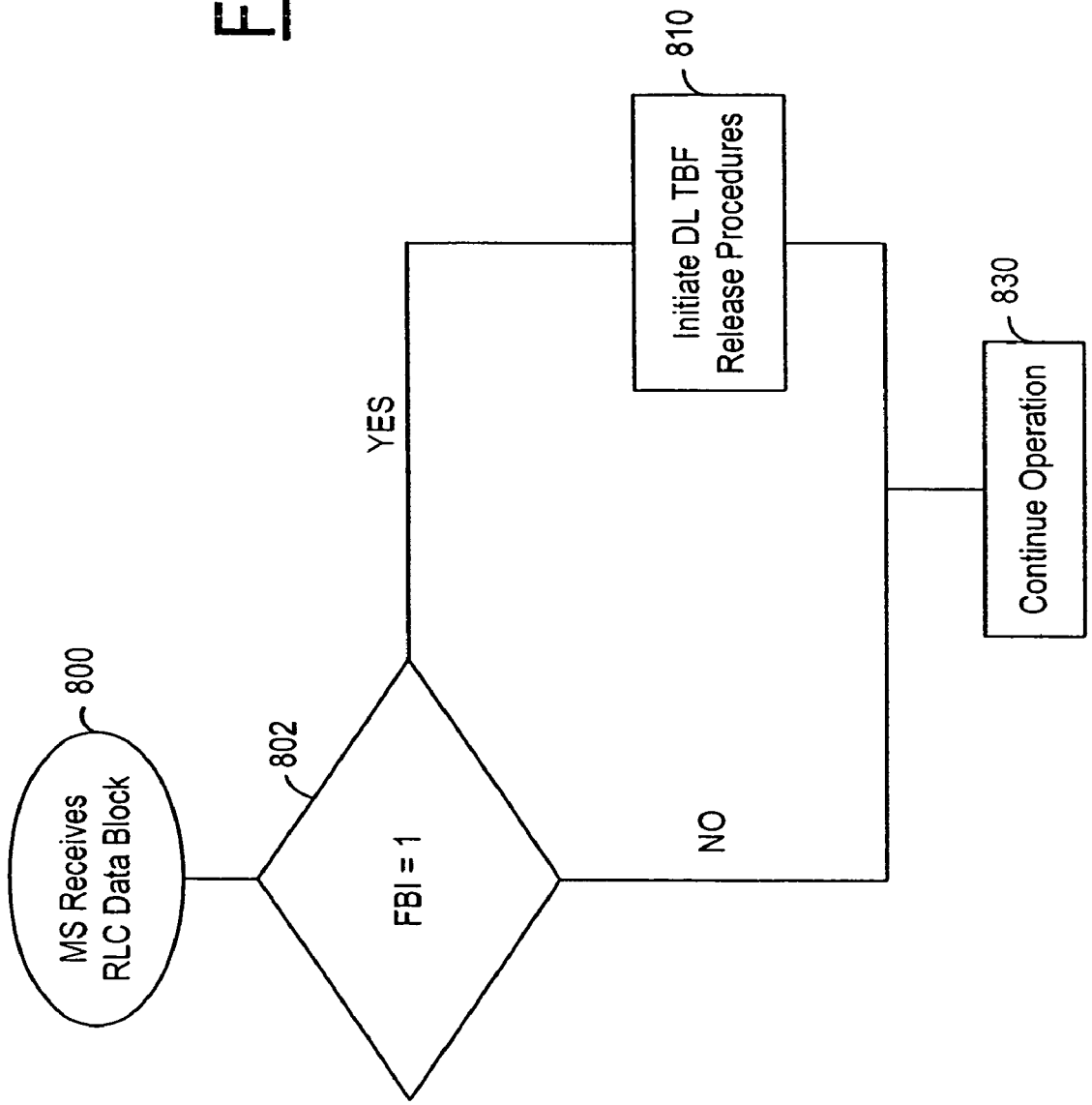
FIG. 8 illustrates a flow diagram for the reception of the downlink RLC blocks.

FIG. 8 shows a flow diagram of the steps for receiving a RLC block from the network to a mobile station, 600. In step 602 the mobile station checks the value of the FBI parameter from the received RLC block. If the parameter FBI=1, the downlink TBF release procedure is initiated, step 810. If in step 802, the parameter FRI≠1, this means that the mobile station continues the receive procedure of the present TBF, step 830.

Figure 9:
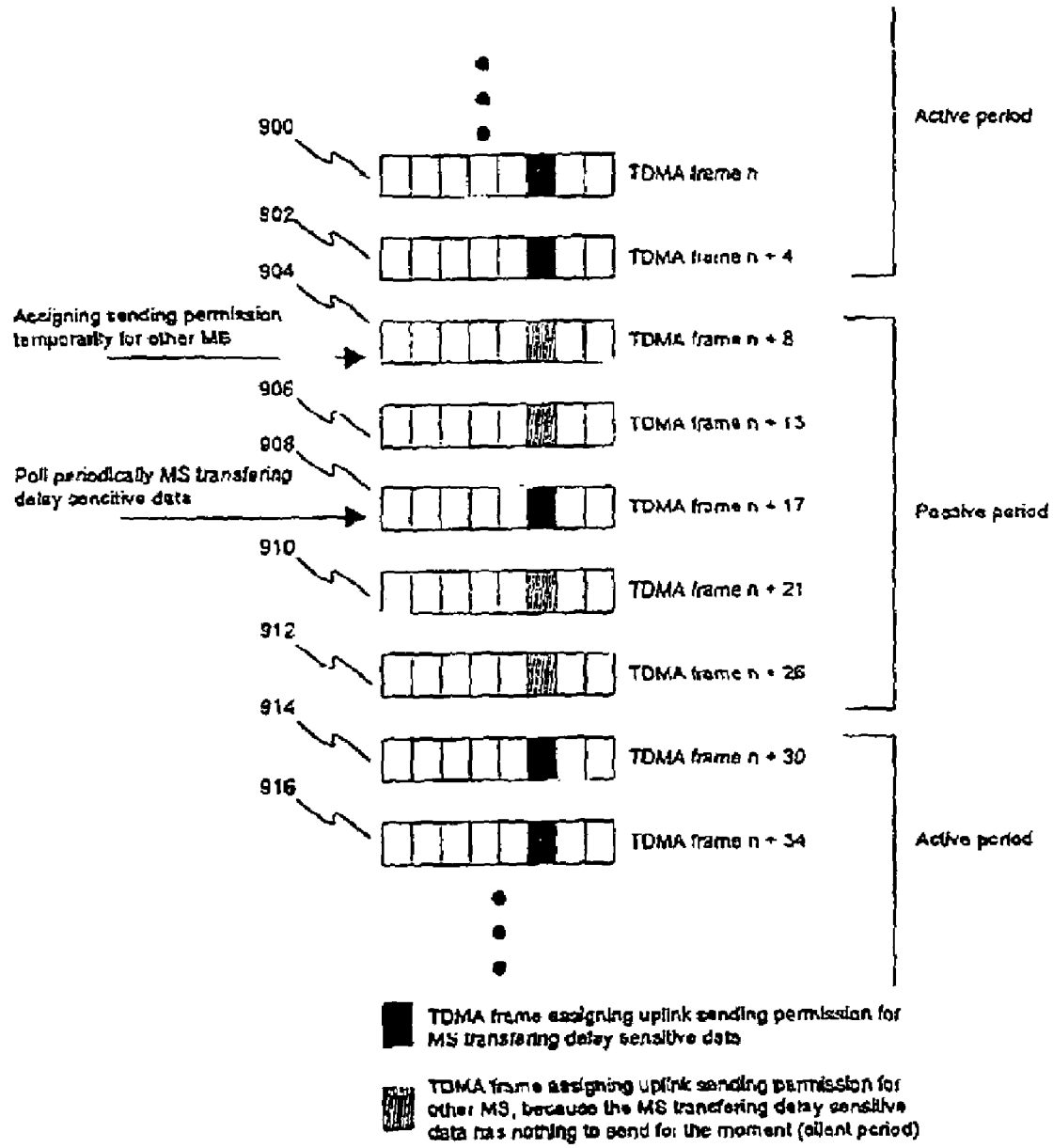
FIG. 9 illustrates TDMA frames of active and passive periods of a delay sensitive data flow.

FIG. 9 shows successive TDMA frames, in which time slot 5 is used for a packet data channel. In the TDMA frames 900 and 902, the packet data channel is allocated for an active connection of delay sensitive data transfer. As the active period changes into a passive (silent) period, the network assigns a transmit permission to a second connection in frame 904. During the passive period, frames 904–912, the network also periodically assigns sending permissions to the mobile station of the first connection for a channel request, frame 908. As the active period starts again, frames 914, 916, the permission for an uplink data transfer may be given back to the first connection. If the second connection is transferring delay sensitive data as well, then one of the connections may be reallocated to another packet data channel at the beginning or at the end of the passive period.

When the same packet data channel is allocated to several passive connections, all the other delay sensitive users can be reallocated to other packet data channels when one of them starts transmitting. Alternatively they may wait for an uplink transmission permit on the same packet data channel. In practice the reallocation may be carried out by sending a signalling message, such as a PACKET UPLINK ASSIGN- MENT, containing new packet data channel allocation to each mobile station being reallocated. Another alternative is to send a single signalling message, such as a PACKET REALLOCATION, containing new packet data channel allocations to all/some mobile stations being reallocated. Using only one signalling message leaves more free radio capacity for other purposes.

When the network receives delay sensitive data for a mobile station, the network reserves as much downlink packet data channel capacity to the mobile station as is needed. This naturally requires that the network has the needed resources available. This may means that the packet data channel is dedicated temporarily for a single mobile station in the downlink direction. During the passive periods in downlink delay sensitive data transfer the network may assign downlink transmission permissions to other mobile stations and thus the network can transmit data to other mobile stations. In order to prevent a situation where the network receives delay sensitive data to more than one mobile station simultaneously on the same packet channel/channels and thus would have to block all but one, the network may distribute the other mobile stations using delay sensitive data transfer to other packet data channels. The distribution can be made using the following mechanisms:

Early Downlink Assignment

When the network receives delay sensitive data for a mobile station, it reallocates the other delay sensitive data users residing on the same packet data channel. Delay insensitive data users may be reallocated to other packet data channels or alternatively they will wait for a transmission permit on the same packet data channel. The network transmits a signalling message, such as a PACKET DOWNLINK ASSIGNMENT, containing new packet data channel allocations to all/some mobile stations being reallocated.

Late Downlink Assignment

When the network receives delay sensitive data for a mobile station, it does not immediately reallocate the other mobile stations residing on the same packet data channel. Only when the network receives delay sensitive data for a mobile station and the network is already transferring delay sensitive data to some other mobile station on the same packet data channel, does the network assign a new packet data channel to the mobile station. The new packet data channel is assigned, e.g. by sending a PACKET DOWNLINK ASSIGNMENT signalling message to the mobile station.

The network should ensure that the delay sensitive data does not need to queue too long for a downlink transmission permit. The network should also ensure that the signalling messages related to the other Temporary Block Flows of other mobile stations do not excessively occupy the packet data channel. This may be accomplished by giving the same or a higher priority to the delay sensitive data transfer compared to signalling messages of other Temporary Block Flows.

When the network temporarily has no delay sensitive data to be transmitted, it preserves the Temporary Block Flow and does not set the FBI field to value "1" after transmitting the last buffered RLC data block. The mobile station controls the termination of the downlink TBF or the network may contain a logical entity that is able to determine, when the TBF is to be released.

Figure 10:
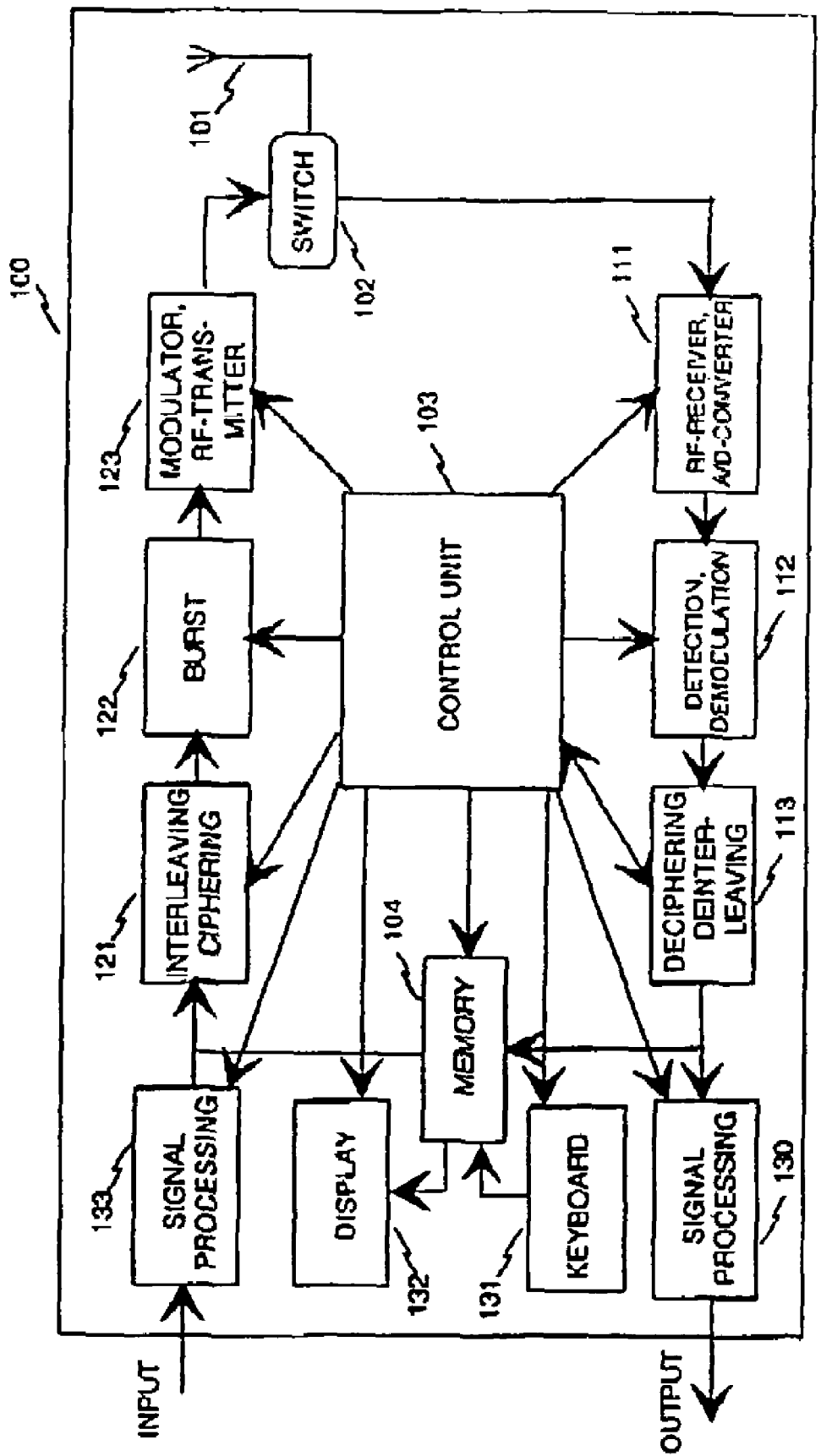
FIG. 10 illustrates a block diagram of a mobile station according to the invention.

FIG. 10 shows a block diagram of a mobile station 100. The mobile station comprises an antenna 101 for receiving radio frequency signals from base stations. The received RF signal is led with the switch 102 to the RF receiver 111, in which the RF signal is amplified and converted digital. Thereafter the signal is detected and demodulated in block 112. The type of the demodulator depends on the system radio interface. It may include a QAM demodulator, or a RAKE combiner. The deciphering and deinterleaving is made in block 113. After this, the signal is processed according to the signal type (speech/data). The received packet data can be converted to sound (acoustic signal) with a loudspeaker, or the received packet data can be linked to a separate device, such as a video monitor. A control unit 103 controls the receiver blocks according to a program that is stored into a memory 104.

In the transmission of a signal, the control unit controls the signal processing lock 133 according to the type of signal. Block 121 further makes the ciphering and interleaving for the signal. Bursts are formed from the coded data in block 122. The bursts are further modulated and amplified in block 123. The RF signal is led to the antenna 101 via the switch 102 for transmission. The processing and transmission blocks are also controlled by the control unit. Especially the control unit controls the transmission blocks in such a way that the MAC header parameters of the RLC block are coded and transmitted according to the present invention. Also the channel selection is controlled by the control unit in such a way that the assigned packet data channel is used according to the invention.

In general, the processing of information in a telecommunication device takes place in an arrangement of processing capacity in the form of microprocessor(s) and memory in the form of memory circuits. Such arrangements are known as such from the technology of mobile stations and fixed network elements. To convert a known telecommunication device into a telecommunication device according to the invention it is necessary to store into the memory means a set of machine-readable instructions that instruct the microprocessor(s) to perform the operations described above. Composing and storing into memory of such instructions involves known technology which, when combined with the teaching herein is within the capabilities of a person skilled in the art. On the network side, the features according to the invention can be implement e.g. in the Packet Control Unit PCU that assigns e.g. uplink and downlink sending permissions for mobile stations. The packet control unit may be located e.g. in the Base Transceiver Station BTS, Base Station Controller BCS or Serving GPRS Support Node SGSN.

The information on the following data transfer period can be transferred on the packet data channel, or it may be transferred in a signalling message on some control channel such as SACCH (Slow Associated Control CHannel) of the GSM system. Thus the parameters in a MAC header field of an RLC block are given as examples only; many other signalling possibilities exist for transferring the corresponding information. Especially the use of the SACCH or a comparable control channel will enable the transmission of such information at any time, irrespective of whether there is currently an active period or not.

The above RLC/MAC control of TBF setup and release is not in any way restricted to transferring speech data, but it can be applied in a packet radio service where any data flows with passive and active periods are transferred. One example is video data transfer, wherein a moving/changing video image would require an active data flow and still video image periods which would not require data transfer for the image update. The invention is also applicable to various Internet uses, such as telnet interaction with a remote computer.

The above description sets forth an exemplary embodiment of the RLC/MAC layer control of TBF for real-time data transfer. This TBF control is used at the lower layers for the application layer control of TBF as are fully described below.

Application Level Control of TBF

The present invention is directed to control of Temporary Block Flow (TBF) at the application level of a multi-level communication over general packet radio service (GPRS). It is particularly directed to applications which have the need for inhibiting the release of TBF during passive or silent periods which may exist during the execution of the application. Such applications include voice applications, telnet interaction with remote computers over the Internet as well as web browsing over the Internet.

According to the invention, the application participates in the setup and release of TBF such that TBF may be defined and signalled from the upper layer protocol application to the RLC/MAC layer so as to trigger a TBF control event according to application requirements, rather than to release TBF during the occurrence of a silent or passive period. In summary, the application communicates information to the RLC/MAC layer so that based upon this information a special type TBF is set up or released. The RLC/MAC layer implementation of TBF setup and release is as described above.

In particular, different types of call control signalling can be used to set up radio bearers and an end-to-end connection between two users. For example, in voice communication over GSM/EDGE RAN (EGRS) H.323 or SIP, signalling can be used. It is also noticed, that other connection control signalling exists and can be used e.g. described in ETSI GSM 04.08 call control specification.

TBF Setup

When the mobile station (user) starts a voice connection, a certain type of packet data protocol (PDP) context is required from the network. From this context information or from the sent signalling message, the existence of voice or other real-time traffic type application can be determined. Such information can be communicated to the RLC/MAC layer through the protocol stack in conjunction with a special type of TBF (in one implementation the TBF may be the same as that used in other applications). This special type of TBF is relevant because not only does the upper layer application participate in causing it to be set up, but also because this special type TBF is released when the upper layer application signals that it can be released. Thus the application participates in controlling the duration of the TBF.

TBF may be established beforehand when there is still no data to be transmitted. TBF may also be established only at the same time when the first data packets arrive at the RLC.MAC layer. The special type of TBF prevents the radio connection from being released even though capacity with respect to the radio connection may be given to other mobile stations as set forth in the above-described control of TBF at the RLC/MAC layer. For certain applications, the PDP type context uses normal TBF procedures with respect to setup and release as described in the TBF setup and release section.

It should be noted that there may be a plurality of special type TBFs. Thus a particular special type TBF may be determined by the application according to the context or the data information that the application intends to transmit/receive. For each such special type TBF, the TBF will be on during both active and passive periods, or the TBF may be chosen by the application to be on when the application requires transfer resources.

Notification Method

Figure 11A:
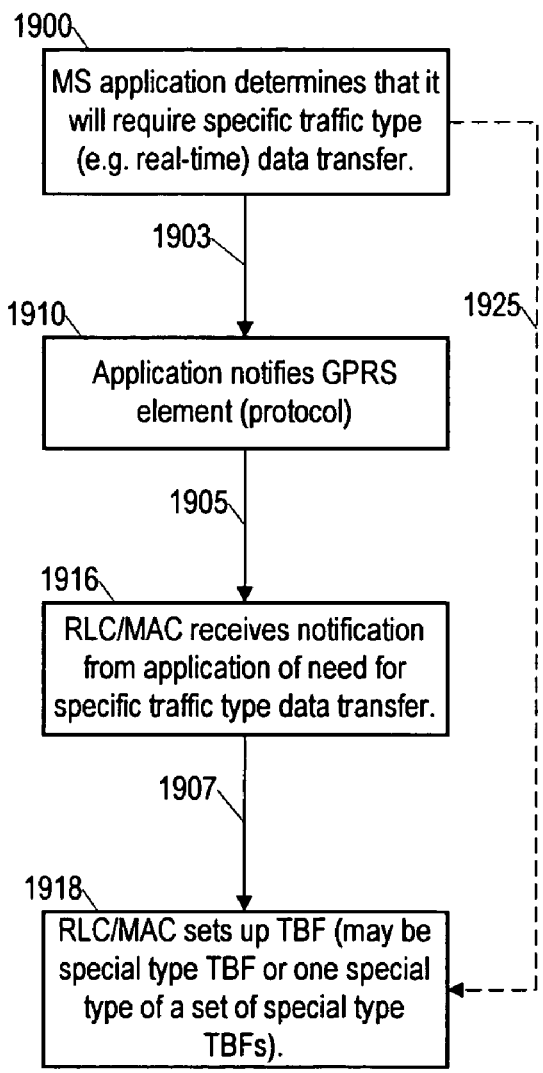
FIG. 11a is a flow chart of TBF setup using a one type of notification method according to the present invention.

As best seen in FIG. 11a, when an application transfers specific traffic type data (e.g. real-time data which has inactive periods), the application notifies GPRS elements (protocols) in order to initiate a set up of a special type of TBF that uses a TBF release mechanism as set forth in the above described RLC/MAC TBF section. In a simple embodiment, only one TBF release with no alternatives is available. In such an embodiment the mobile station only relays data and does not communicate with user applications.

Figure 11B:
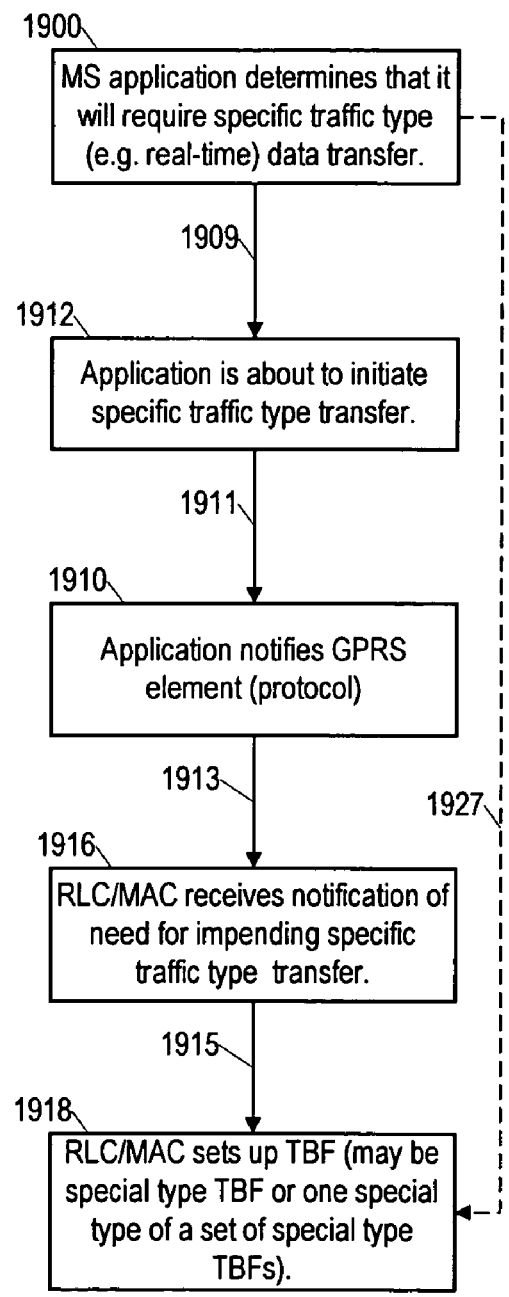

Referring again to FIG. 11a, the application first determines that it will require specific traffic type data transfer (step 1900). The application may notify GPRS elements of the special type of TBF setup immediately (step 1910). As seen in FIG. 11b, the application can notify GPRS elements after specific traffic type transfer is about to begin (steps 1912, 1910, 1916) in which situation, the connection does not require a specific traffic type transfer characteristic to be established before actual specific traffic type data transfer is to occur. In either situation, the application may send e.g. a special message to the GPRS element using the same path as used by the data messages (path 1903, 1905, 1907; 1909, 1911, 1913, 1915), wherein at least a specific format is used for a data packet for notifying the GPRS element (of the special message) or the application may use a specific control path (1925; 1927) currently used for such purposes as activating and deactivating PDP context etc. (such as the use of the attention-AT-commands).

When GPRS elements receive notification that can be interpreted as a need to initiate a special TBF setup, the information is transferred to the RLC/MAC (step 1916) to insure that the RLC/MAC receives this information even if a direct connection is not made between the RLC/MAC and the application. Such a situation could occur where the application communicates with GPRS MM (Mobility Management) layer. The RLC/MAC then initiates the special type of TBF setup (step 1918) using the procedures as set forth above with regard to RLC/MAC TBF setup and release.

In all these situations, the present invention provides for the application executing at the application level to determine the chosen special type TBF associated with a corresponding TBF release mode so as to optimize communications using GPRS for traffic type data transfers.

Snooper Methodology

Figure 12:
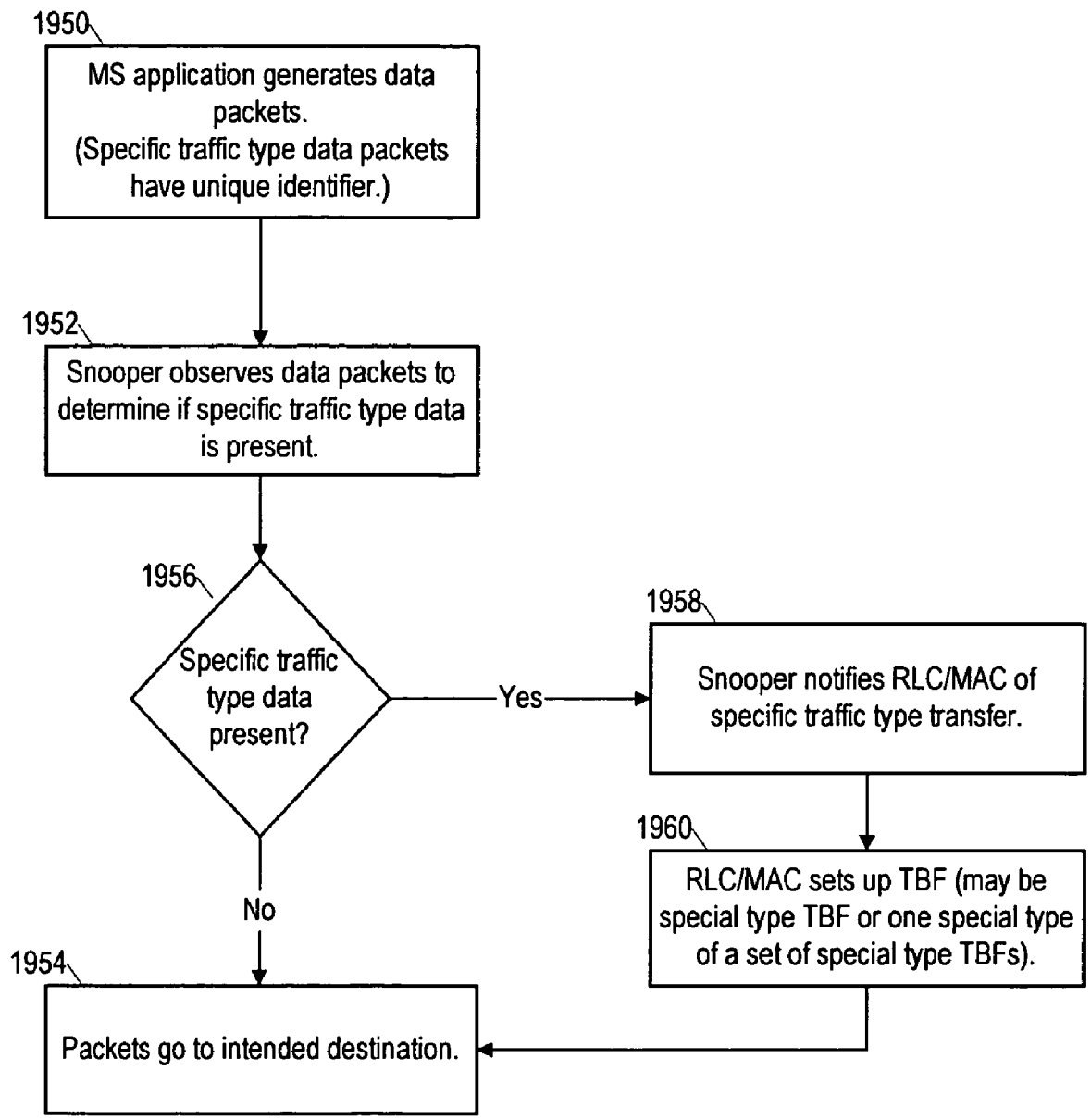
FIG. 12 is a flow chart of TBF setup using a snooper method according to the present invention.

As best seen in FIG. 12, in some implementations of GPRS, a snooper is present, which in fact is an element that can observe data traffic as it is being transferred. The snooper element may be included in a GPRS element (protocol) or it may be located between the application and the GPRS elements. It can even be located in the application itself.

As seen in FIG. 12, the mobile station application generates data packets such that data packets which require data transfer of a specific traffic type have a unique identification associated with these packets (step 1950). The packets are observed by the snooper (step 1952) and continue on to their intended destination (step 1954). If the snooper element determines that the application contains specific traffic type data (step 1956), the snooper notifies the RLC/MAC of the traffic type data transfer (step 1958) and the RLC/MAC then sets up the special type of TBF as described earlier (step 1960). In a simple embodiment, only one TBF type may be used by the system. As stated earlier, the snooper may be located within the MS application itself or it may be located in the RLC/MAC layer. Notification to the RLC/MAC layer occurs if the snooper is not located in this layer.

This snooper element thus is also able to observe the data packets being sent to the application, as well as the data packets being generated by the application. The snooper element is able to interpret the contents of the data packets being transferred and thereby knows if the application is generating a specific traffic type of data packet indicative of data that has inactive periods between active periods. When the snooper notices a special format data packet (e.g. a special packet the application/protocol uses to establish connection with its peer entity), the snooper participates in the initiation of the special type of TBF establishment procedure using the RLC/MAC layer.

In one simple implementation, the RLC/MAC layer observes the Quality of Service (QoS) related associated parameters with messages received from the application. Normally the first data packet is observed and if this data packet header contains special types of information indicative of a specific traffic type data transfer, the special TBF is setup by the RLC/MAC in a manner as described above. Again in a simple embodiment, only one TBF type may be used by the system.

TBF Release

When a certain type of higher layer signalling message (such as H.245 endSessionCommand or TCP/IP FIN COMMAND) is received, the information is communicated through the protocol stack to the RLC/MAC layer where the TBF is released (torn down). The releasing or tear down of the TBF may occur only in one direction (such as uplink) or in cases where there are TBFs in both directions, both TBFs (uplink and downlink) may be released (torn down) simultaneously as described above with regard to RLC/MAC TBF setup and release. The termination of TBFs can be communicated to the peer as part of an RLC data block or it can be communicated in a separate signalling message.

There must also be a mechanism to release TBF if the message that contains such release information is lost. In view of this situation, there is a timer (see Timer step 1014 in FIGS. 13b and 15) that releases the TBF if the RLC/MAC buffer is empty in excess of a predetermined length of time.

Notification Method

Figure 13A:
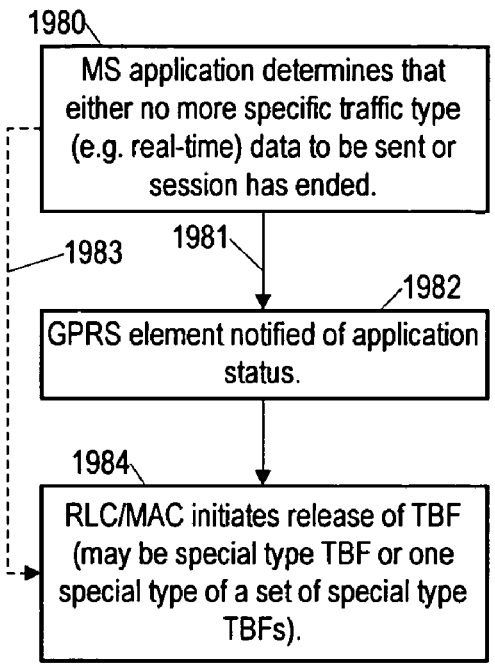
FIG. 13a is a flow chart of TBF release using the notification method according to the present invention.

TBF release can be communicated with a notification method. As seen in FIG. 13a, when there is no more specific traffic type data to transfer or when the session has ended (set 1980), the application notifies the GPRS element of this application status (step 1982). The application may inform the GPRS element of this status by generating a special message to the GPRS element using the same path (1981) as that used for data messages (wherein a special format is used for the data packet containing such information) or the application may use a specific control path (1983) which is currently used for other purposes such as for activating and deactivating PDP context, etc. (such as AT commands). In such a situation it should be noted that it is permissible and relevant that the application control the GPRS protocol stack.

When the GPRS elements receive notification to initiate TBF release procedure, this information is transferred to the RLC/MAC layer in case the application and the RLC/MAC do not communicate directly to each other (step 1984). Again, the procedures as described earlier with regard to RLC/MAC TBF setup and release are used for purposes of releasing the special type of TBF.

Figure 13B:
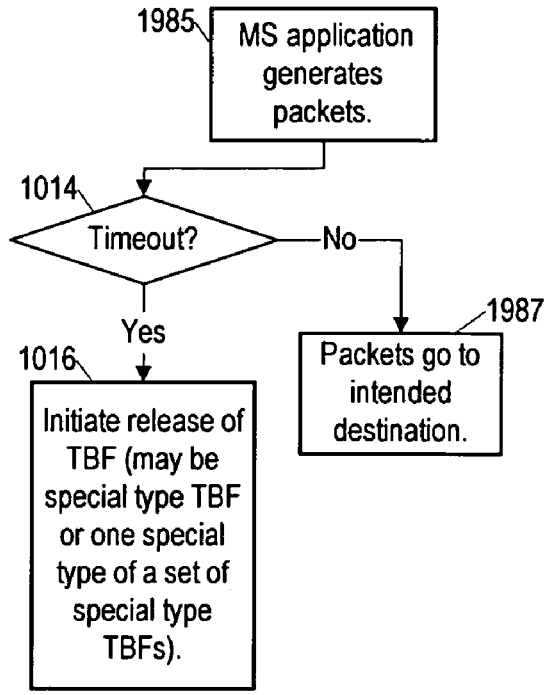
FIG. 13b is a flow chart of TBF release as a result of a time timeout.

FIG. 13b illustrates that all packets generated by the MS application (step 1985) are observed by a timer function (step 1014) and if no packets are seen for some predetermined length of time, a timeout occurs and the special type TBF is released (step 1016). If the timeout does not occur the packets proceed to their destination (step 1987).

Figure 14:
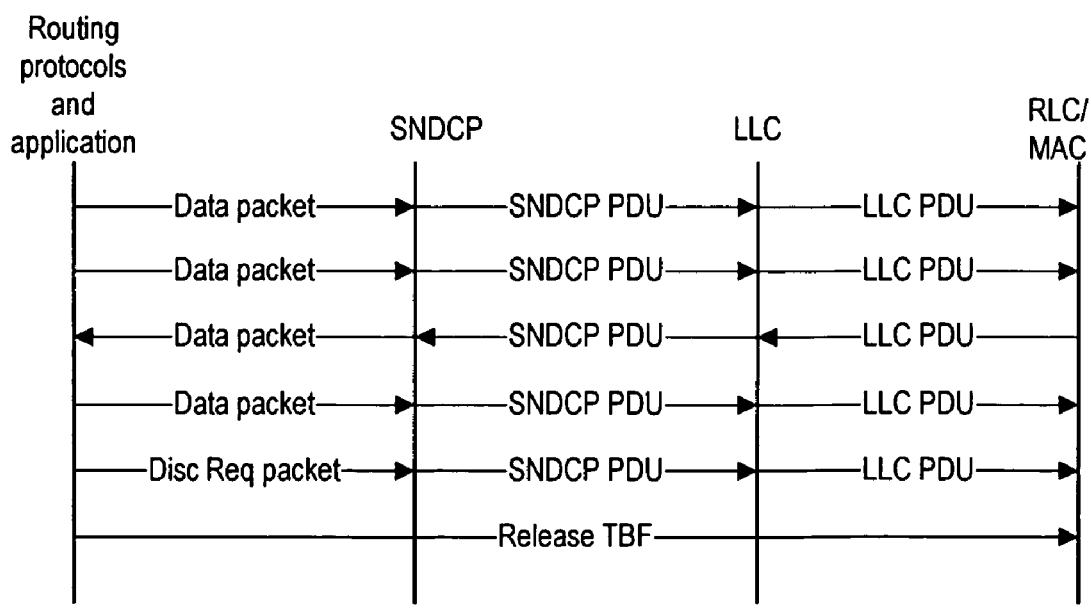
FIG. 14 is a diagram that illustrates TBF release using the notification method as shown in FIG. 13.

FIG. 14 illustrates the notification of the special type of TBF release for the notification method described from the application layer to the RLC/MAC layer.

Snooper Method

A snooper element is one which observes data traffic as the data traffic is transferred. Such an element may be included in GPRS elements (protocols) or it may be located between the application and GPRS elements or in the application itself. If the snooper element is not located in the RLC/MAC layer, the snooper element uses mechanisms as described above with regard to setup and release of TBF in order to notify the RLC/MAC of TBF release. The snooper methodology is best seen with reference to FIG. 15. As seen in FIG. 13, the mobile station can generate data packets (step 1000). The snooper element observes these data packets to determine if a special format data packet indicative of release of TBF (e.g. TCP/IP FIN command) has been received (step 1010). If a special format data packet has been received (step 1012) the snooper element initiates release of TBF as shown by (step 1020) while the packets (if any) are transferred to the intended destination (step 1022). If a special format data packet has not been received, the packets continue on to their destination (step 1020). As indicated, the special data packet indicative of release of TBF can be a data packet that the application uses in connection to its peer entity, such as the H.245 endSessionCommand or the TCP/IP FIN command. Thus the snooper element observes data packets being sent and received and is able to interpret the contents of the data packets being transferred; that is, it knows the protocol/application being used. By so doing, it can perform the examination as described above in order to initiate release of TBF upon determination of receipt of a special packet indicative of such release.

Figure 15:
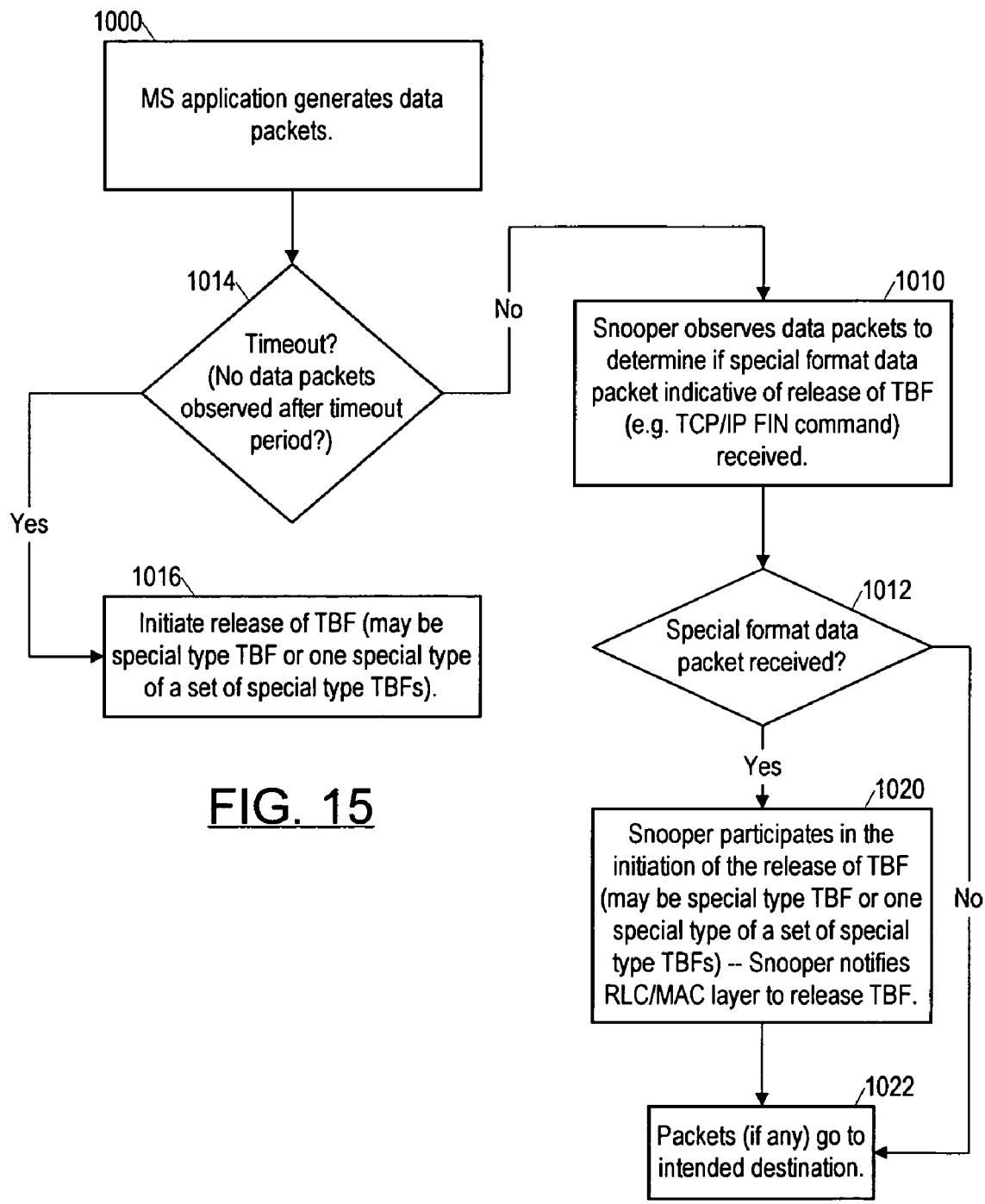
FIG. 15 is a flow chart of TBF release using the snooper method according to the present invention.

In addition, as seen in FIG. 15, a timer step (step 1014), observes the flow of data packets. If data packets are not present for some predetermined length of time, the timer initiates release of TBF (step 1016). This timer function is a watchdog type function in case the application fails to generate the special type of data packet indicative of TBF release. Consequently, applications can start transmitting data over the radio interface after becoming active without having to wait for TBF setup, while on the other hand when the session ends, the TBF (and thus the Temporary Flow Identity—TFI) can be released immediately and not after some timeout has occurred according to the methodology previously discussed.

Figure 16:
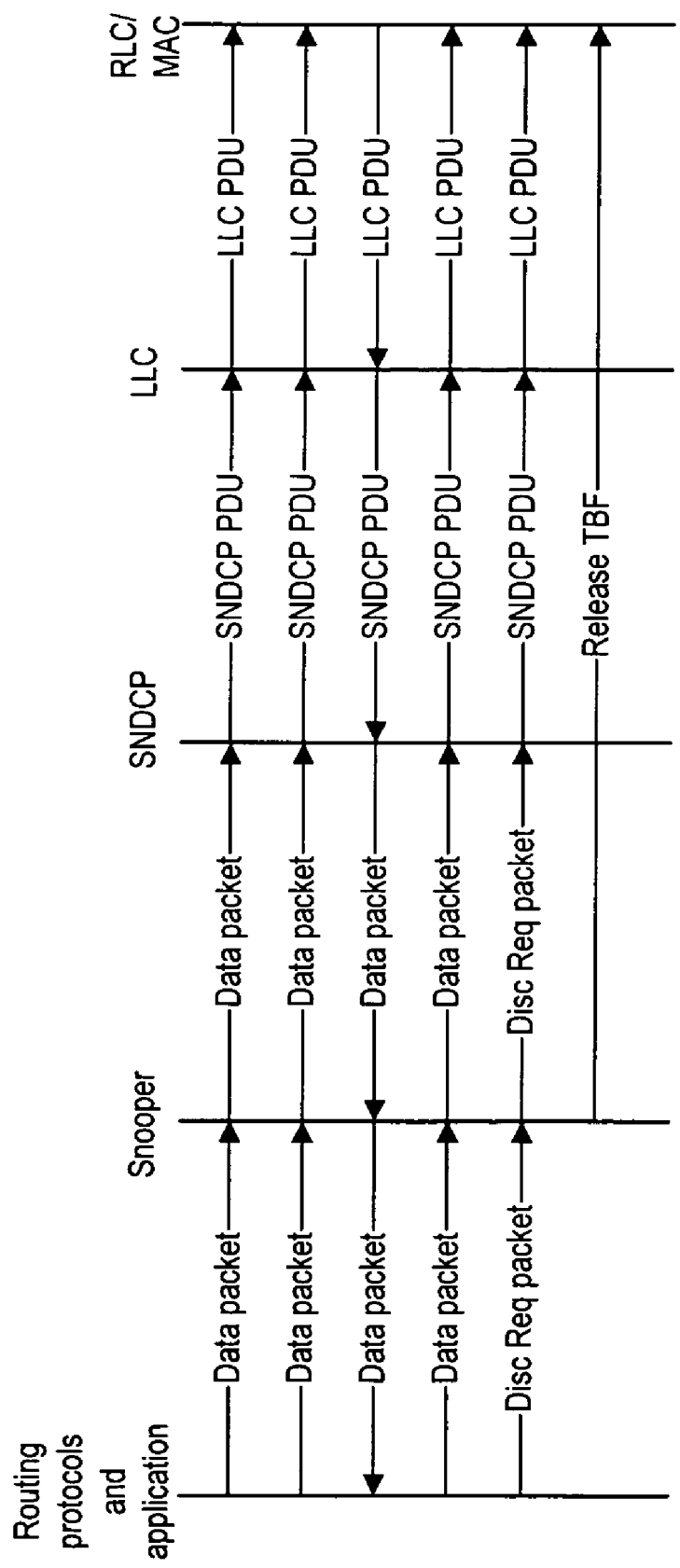
FIG. 16 is a diagram that illustrates TBF release using the snooper method as shown in FIG. 15.

FIG. 16 illustrates the snooper special type of TBF release method from the application layer to the RLC/MAC layer.

In the above examples, the solution for generating a special type of TBF by means of the application is optimal for e.g. real-time data which has multiple active periods separated by inactive periods (e.g. voice communication). It may also be useful e.g. for web browsing and telnet type connections.

TABLE 1

References

[1] Digital cellular telecommunications system (Phase 2+); General Packet Radio Service (GPRS); Mobile Station (MS) – Base Station System (BSS) interface; Radio Link Control/Medium Access Control (RLC/MAC) protocol (GSM 04.60 version 6.1.0); European Telecommunications Standards Institute.
[2] GSM 04.60, "Digital cellular telecommunications system (Phase 2+); General Packet Radio Service (GPRS); Radio Link Control/Medium Access Control (RLC/MAC) protocol", Jul. 1998.

It is readily apparent to those skilled in the art that the objects set forth above have been officially attained, and since certain changes may be made in carrying out the above method without departing from the scope of the invention, it is intended that all matter contained in the above description or shown in the accompanying drawings shall be interpreted as illustrative and not in a limiting sense.

It should also be understood that the following claims are intended to cover all of the generic and specific features of the invention herein described, and all statements of the scope of the invention which, as a matter of language, might be said to fall therebetween.

What is claimed is:

1. A method for transferring a data flow according to a multi-layer protocol including an application layer in which an application is executing, and a plurality of lower level layers, the method of transferring data flow by creating a physical connection on a packet radio service of a telecommunication system including a network and at least one mobile station, said physical connection for transferring data packets on a packet data channel,
wherein the data flow of said data packets comprises at least one active data transfer period, characterized in that the physical connection must be set up and released by setup and release information that defines and signals the set up and release of the physical connection,
wherein the set up and release of the physical connection is defined and signaled from the application executing in the application layer to a lower level layer of the multi-layer protocol so that the control events for setup and release of the physical connection are based upon requirements of the application that is executing in the application layer, and
wherein the physical connection is not released during an inactive period in which there is no data to be transmitted between active data transfer periods, but is released when the set up of the physical connection is signaled from the application layer to the lower level layer.

2. A method according to claim 1, characterized in that the lower level layer that receives said setup and release information from the application executing in the application layer is the radio link control/medium access control (RLC/MAC) layer.

3. A method according to claim 1, characterized in that the lower level layer that receives said setup and release information from the application executing in the application layer is the radio link control (RLC) layer.

4. A method according to claim 1, characterized in that the lower level layer that receives said setup and release information from the application executing in the application layer is the medium access control (MAC) layer.

5. A method according to claim 1, characterized in that the setup and release information is transferred on the packet data channel.

6. A method for transferring a data flow according to a multi-layer protocol including an application layer in which an application is executing, and a plurality of lower level layers, the method of transferring data flow by creating a physical connection on a packet radio service of a telecommunication system including a network and at least one mobile station, said physical connection for transferring data packets on a packet data channel,
wherein the data flow of said data packets comprises at least one active data transfer period, characterized in that the physical connection must be set up and released by setup and release information that defines and signals the set up and release of the physical connection, and
wherein the set up and release of the physical connection is defined and signaled from the application executing in the application layer to a lower level layer of the multi-layer protocol so that the control events for setup and release of the physical connection are based upon requirements of the application that is executing in the application layer,
the method being further characterized in that the method of transferring data flow requires generation of a packet data protocol (PDP) upon initiation of the application, wherein at least part of the context information is communicated to a radio link control/medium access control (RLC/MAC) layer through the protocol stack; wherein the physical connection is not released during an inactive period if the application executing in the application layer is determined to be a specific traffic type application.

7. A method according to claim 6, characterized in that the data flow is arranged to consist of data blocks, and said setup and release information is transferred in a header of a data block.

8. A method according to claim 7, characterized in that the radio service is GPRS and the header is a MAC header of an RLC block.

9. A method for transferring a data flow according to a multi-layer protocol including an application layer in which an application is executing, and a plurality of lower level layers, the method of transferring data flow by creating a physical connection on a packet radio service of a telecommunication system including a network and at least one mobile station, said physical connection for transferring data packets on a packet data channel, wherein the data flow of said data packets comprises at least one active data transfer period, characterized in that
the physical connection must be set up and released by setup and release information that defines and signals the set up and release of the physical connection, and wherein the set up and release of the physical connection is defined and signaled from the application executing in the application layer to a lower level layer of the multi-layer protocol so that the control events for setup and release of the physical connection are based upon requirements of the application that is executing in the application layer, the method being further characterized in that the radio service is GPRS and further characterized in that if the application executing in the application layer transfers specific traffic type data, the application notifies GPRS protocols in order to set up a Temporary Block Flow (TBF) of a special type that will not be released if an inactive period occurs that is less than a predetermined amount.

10. A method according to claim 9, wherein there is a set of special type TBFs, and wherein the application sets up a special type TBF based upon requirements of the application.

11. A method according to claim 9, characterized in that the application executing in the application layer notifies the GPRS protocol of the special type of TBF upon initialization of the application.

12. A method according to claim 11, characterized in that the application executing in the application layer notifies the GPRS protocol of the special type of TBF by using the same path as for data messages generated by the application.

13. A method according to claim 12, wherein the GPRS protocol upon receipt of notification to set up a special type of TBF, transfers the notification to the RLC/MAC layer to ensure that the RLC/MAC initiates the special type of TBF even if the application executing in the application layer does not communicate directly with the RLC/MAC layer.

14. A method according to claim 11, characterized in that the method of transferring data flow requires generation of a packet data protocol (PDP) upon initiation of the application executing in the application layer, wherein at least part of the context information is communicated to a radio link control/medium access control (RLC/MAC) layer through the protocol stack; further characterized in that the application notifies the GPRS protocol of the special type of TBF by using a specific control path used for activating and deactivating the PDP.

15. A method according to claim 14, wherein the GPRS protocol upon receipt of notification to set up a special type of TBF, transfers the notification to the RLC/MAC layer to ensure that the RLC/MAC initiates the special type of TBF even if the application executing in the application layer does not communicate directly with the RLC/MAC layer.

16. A method according to claim 9, characterized in that the application executing in the application layer notifies the GPRS protocol of the special type of TBF only when a specific traffic type transfer is about to start.

17. A method according to claim 16, characterized in that the application executing in the application layer notifies the GPRS protocol of the special type of TBF by using the same path as for data messages.

18. A method according to claim 13, wherein the GPRS protocol upon receipt of notification to set up a special type of TBF, transfers the notification to the RLC/MAC layer to ensure that the RLC/MAC initiates the special type of TBF even if the application executing in the application layer does not communicate directly with the RLC/MAC layer.

19. A method according to claim 16, characterized in that the method of transferring data flow requires generation of a packet data protocol (PDP) upon initiation of the application executing in the application layer, wherein at least part of the PDP context is communicated to a radio link control/medium access control (RLC/MAC) layer through the protocol stack; further characterized in that the application notifies the GPRS protocol of the special type of TBF by using a specific control path used for activating and deactivating the PDP.

20. A method according to claim 16, characterized in that the method of transferring data flow requires initialization of a packet data protocol (PDP) before the application is executed, wherein at least part of the PDP context information is communicated to a radio link control/medium access control (RLC/MAC) layer through the protocol stack; further characterized in that the application notifies the GPRS protocol of the special type of TBF by using a specific control path used for activating and deactivating the PDP.

21. A method according to claim 19, wherein the GPRS protocol upon receipt of notification to set up a special type of TBF, transfers the notification to the RLC/MAC layer to ensure that the RLC/MAC initiates the special type of TBF even if the application executing in the application layer does not communicate directly with the RLC/MAC layer.

22. A method according to claim 19, wherein the control path may be different for setup and release of the TBF.

23. A method according to claim 10, characterized in that the application executing in the application layer notifies the GPRS protocol of the special type of TBF upon initialization of the application.

24. A method according to claim 23, characterized in that the application executing in the application layer notifies the GPRS protocol of the special type of TBF by using the same path as for data messages generated by the application.

25. A method according to claim 24, wherein the GPRS protocol upon receipt of notification to set up a special type of TBF, transfers the notification to the RLC/MAC layer to ensure that the RLC/MAC initiates the special type of TBF even if the application executing in the application layer does not communicate directly with the RLC/MAC layer.

26. A method according to claim 23, characterized in that the method of transferring data flow requires generation of a packet data protocol (PDP) upon initiation of the application executing in the application layer, wherein at least part of the PDP context information is communicated to a radio link control/medium access control (RLC/MAC) layer through the protocol stack; further characterized in that the application notifies the GPRS protocol of the special type of TBF by using a specific control path used for activating and deactivating the PDP.

27. A method according to claim 26, wherein the GPRS protocol upon receipt of notification to set up a special type of TBF, transfers the notification to the RLC/MAC layer to ensure that the RLC/MAC initiates the special type of TBF even if the application executing in the application layer does not communicate directly with the RLC/MAC layer.

28. A method according to claim 10, characterized in that the application executing in the application layer notifies the GPRS protocol of the special type of TBF only when a specific traffic type transfer is about to start.

29. A method according to claim 28, characterized in that the application executing in the application layer notifies the GPRS protocol of the special type of TBF by using the same path as for data messages.

30. A method according to claim 25, wherein the GPRS protocol upon receipt of notification to set up a special type of TBF, transfers the notification to the RLC/MAC layer to ensure that the RLC/MAC initiates the special type of TBF even if the application executing in the application layer does not communicate directly with the RLC/MAC layer.

31. A method according to claim 28, characterized in that the method of transferring data flow requires generation of a packet data protocol (PDP) upon initiation of the application executing in the application layer, wherein at least part of the PDP context information is communicated to a radio link control/medium access control (RLC/MAC) layer through the protocol stack; further characterized in that the application notifies the GPRS protocol of the special type of TBF by using a specific control path used for activating and deactivating the PDP.

32. A method according to claim 28, characterized in that the method of transferring data flow requires initialization of a packet data protocol (PDP) before the application is executed, wherein at least part of the PDP context is communicated to a radio link control/medium access control (RLC/MAC) layer through the protocol stack; further characterized in that the application notifies the GPRS protocol of the special type of TBF by using a specific control path used for activating and deactivating the PDP.

33. A method according to claim 31, wherein the GPRS protocol upon receipt of notification to set up a special type of TBF, transfers the notification to the RLC/MAC layer to ensure that the RLC/MAC initiates the special type of TBF even if the application executing in the application layer does not communicate directly with the RLC/MAC layer.

34. A method for transferring a data flow according to a multi-layer protocol including an application layer in which an application is executing, and a plurality of lower level layers, the method of transferring data flow by creating a physical connection on a packet radio service of a telecommunication system including a network and at least one mobile station, said physical connection for transferring data packets on a packet data channel, wherein the data flow of said data packets comprises at least one active data transfer period, characterized in that
the physical connection must be set up and released by setup and release information that defines and signals the set up and release of the physical connection, and wherein the set up and release of the physical connection is defined and signaled from the application executing in the application layer to a lower level layer of the multi-layer protocol so that the control events for setup and release of the physical connection are based upon requirements of the application that is executing in the application layer,
the method being further characterized in that the radio service is GPRS and further characterized in that if the application executing in the application layer transfers specific traffic type data, the application notifies GPRS protocols in order to set up a Temporary Block Flow (TBF) that will not be released if an inactive period occurs that is less than a predetermined amount.

35. A method according to claim 34, characterized in that the application executing in the application layer notifies the GPRS protocol of the special type of TBF upon initialization of the application.

36. A method according to claim 35, characterized in that the application executing in the application layer notifies the GPRS protocol of the special type of TBF by using the same path as for data messages generated by the application.

37. A method according to claim 36, wherein the GPRS protocol upon receipt of notification to set up a special type of TBF, transfers the notification to the RLC/MAC layer to ensure that the RLC/MAC initiates the special type of TBF even if the application executing in the application layer does not communicate directly with the RLC/MAC layer.

38. A method according to claim 35, characterized in that the method of transferring data flow requires generation of a packet data protocol (PDP) upon initiation of the application executing in the application layer, wherein at least part of the PDP context information is communicated to a radio link control/medium access control (RLC/MAC) layer through the protocol stack; further characterized in that the application notifies the GPRS protocol of the special type of TBF by using a specific control path used for activating and deactivating the PDP.

39. A method according to claim 38, wherein the GPRS protocol upon receipt of notification to set up a special type of TBF, transfers the notification to the RLC/MAC layer to ensure that the RLC/MAC initiates the special type of TBF even if the application executing in the application layer does not communicate directly with the RLC/MAC layer.

40. A method according to claim 34, characterized in that the application executing in the application layer notifies the GPRS protocol of the special type of TBF only when a specific traffic type transfer is about to start.

41. A method according to claim 40, characterized in that the application executing in the application layer notifies the GPRS protocol of the special type of TBF by using the same path as for data messages.

42. A method according to claim 37, wherein the GPRS protocol upon receipt of notification to set up a special type of TBF, transfers the notification to the RLC/MAC layer to ensure that the RLC/MAC initiates the special type of TBF even if the application executing in the application layer does not communicate directly with the RLC/MAC layer.

43. A method according to claim 40, characterized in that the method of transferring data flow requires generation of a packet data protocol (PDP) upon initiation of the application executing in the application layer, wherein at least part of the PDP context information is communicated to a radio link control/medium access control (RLC/MAC) layer through the protocol stack; further characterized in that the application notifies the GPRS protocol of the special type of TBF by using a specific control path used for activating and deactivating the PDP.

44. A method according to claim 40, characterized in that the method of transferring data flow requires initialization of a packet data protocol (PDP) before the application is executed, wherein at least part of the PDP context is communicated to a radio link control/medium access control (RLC/MAC) layer through the protocol stack; further characterized in that the application notifies the GPRS protocol of the special type of TBF by using a specific control path used for activating and deactivating the PDP.

45. A method according to claim 43, wherein the GPRS protocol upon receipt of notification to set up a special type of TBF, transfers the notification to the RLC/MAC layer to ensure that the RLC/MAC initiates the special type of TBF even if the application executing in the application layer does not communicate directly with the RLC/MAC layer.

46. A method for transferring a data flow according to a multi-layer protocol including an application layer in which an application is executing, and a plurality of lower level layers, the method of transferring data flow by creating a physical connection on a packet radio service of a telecommunication system including a network and at least one mobile station, said physical connection for transferring data packets on a packet data channel, wherein the data flow of said data packets comprises at least one active data transfer period, characterized in that
the physical connection must be set up and released by setup and release information that defines and signals the set up and release of the physical connection, and wherein the set up and release of the physical connection is defined and signaled from the application executing in the application layer to a lower level layer of the multi-layer protocol so that the control events for setup and release of the physical connection are based upon requirements of the application that is executing in the application layer, the method being further characterized in that the application executing in the application layer generates a special format data packet that designates that the physical connection is not to be released upon the occurrence of an inactive period less than predetermined amount, further characterized in that the data packets generated by the application are observed by a special protocol (snooper) such that if said special format data packet is observed, Temporary Block Flow (TBF) is set up.

47. A method according to claim 46, characterized in that the application generates a special format data packet that contains a quality-of-service (QoS) parameter in the RLC/MAC header of the first generated data packet by said application executing in the application layer.

48. The method of claim 1, wherein the physical connection is not released during an inactive period if the application executing in the application layer is determined to be a specific traffic type application.

* * * * *